United States Patent
Majumder

(10) Patent No.: US 9,672,308 B1
(45) Date of Patent: Jun. 6, 2017

(54) METHODS, SYSTEMS, AND COMPUTER PROGRAM PRODUCT FOR IMPLEMENTING THREE-DIMENSIONAL OPERATIONS FOR ELECTRONIC DESIGNS

(71) Applicant: Cadence Design Systems, Inc., San Jose, CA (US)

(72) Inventor: Chayan Majumder, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 156 days.

(21) Appl. No.: 14/645,360

(22) Filed: Mar. 11, 2015

(51) Int. Cl.
*G06F 17/50* (2006.01)

(52) U.S. Cl.
CPC ...... *G06F 17/5068* (2013.01); *G06F 17/5045* (2013.01); *G06F 17/5081* (2013.01)

(58) Field of Classification Search
CPC ............. G06F 17/5045; G06F 17/5068; G06F 17/5081; G06F 2217/06
USPC ......... 716/100–103, 110–111, 119, 122, 139
See application file for complete search history.

(56) References Cited

U.S. PATENT DOCUMENTS

| | | | |
|---|---|---|---|
| 7,827,519 B2 | 11/2010 | Scheffer et al. | |
| 8,032,857 B2 * | 10/2011 | McIlrath | G06F 17/5068 716/103 |
| 8,271,909 B2 | 9/2012 | Majumder et al. | |
| 8,312,398 B2 | 11/2012 | Majumder et al. | |
| 8,438,531 B2 | 5/2013 | Majumder et al. | |
| 8,533,626 B2 | 9/2013 | Majumder et al. | |
| 8,612,923 B2 | 12/2013 | Arora et al. | |
| 8,640,078 B2 | 1/2014 | Majumder et al. | |
| 8,640,079 B2 | 1/2014 | Majumder et al. | |
| 8,645,901 B2 | 2/2014 | Majumder et al. | |
| 8,711,177 B1 | 4/2014 | Majumder et al. | |
| 9,026,960 B1 | 5/2015 | Majumder et al. | |

\* cited by examiner

*Primary Examiner* — Paul Dinh
(74) *Attorney, Agent, or Firm* — Vista IP Law Group, LLP

(57) ABSTRACT

Disclosed are mechanisms for implementing three-dimensional operations for electronic circuit designs. These mechanisms identify a cross-layer layout portion by identifying a first electronic design as an editable layout portion and a second electronic design as a selectable and non-editable layout portion in a single window, determine a ruler by identifying or generating the ruler for a three-dimensional operation across the first electronic design and the second electronic design on different layers, identify one or more starting targets and one or more end targets within an aperture at least by determining the one or more starting targets and one or more end targets based in part or in whole upon a location of the aperture and the one or more rulers, and perform the three-dimensional operation at least by manipulating a plurality of shapes in the cross-layer layout portion based in part or in whole upon the one or more rulers.

20 Claims, 15 Drawing Sheets

610F 604I 602I 606J 610J 610F 602J 604J

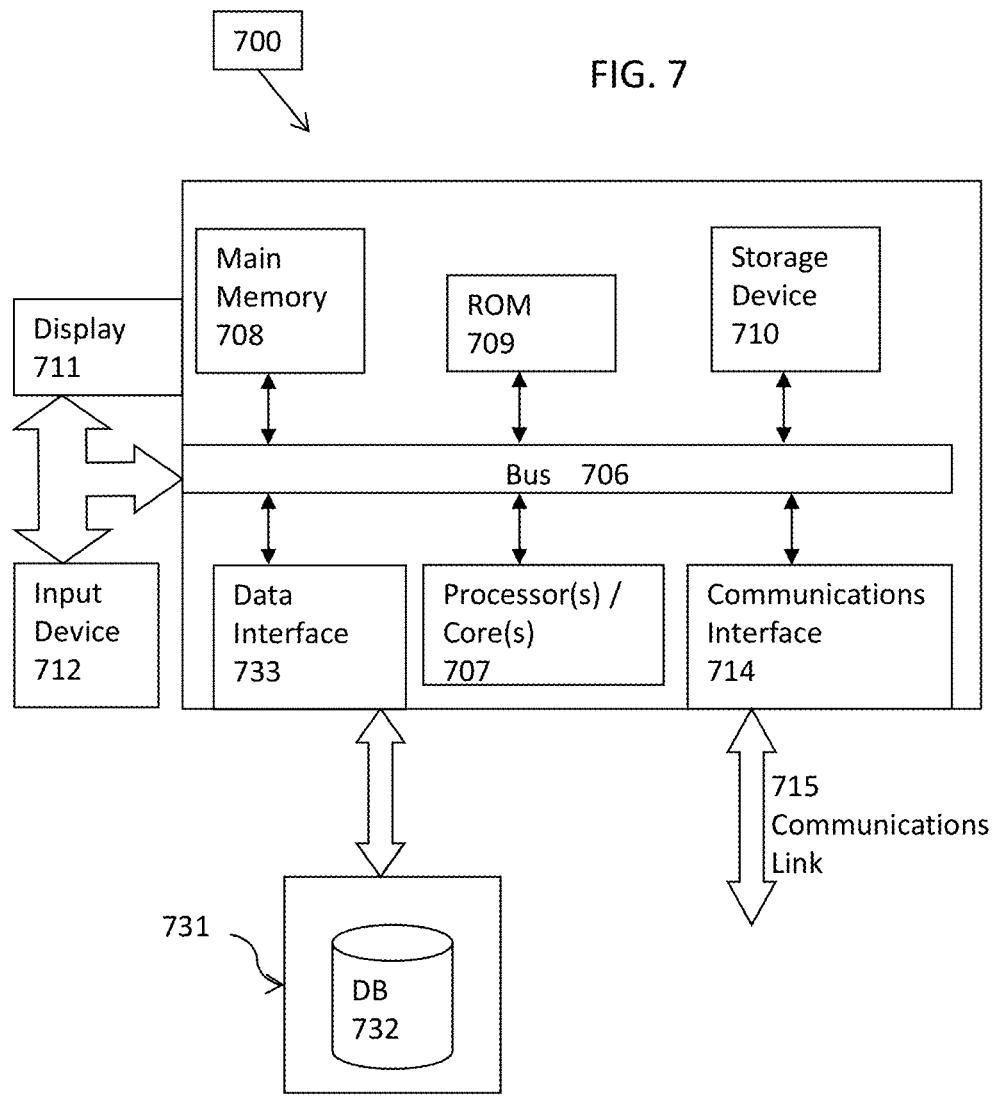

METHODS, SYSTEMS, AND COMPUTER PROGRAM PRODUCT FOR IMPLEMENTING THREE-DIMENSIONAL OPERATIONS FOR ELECTRONIC DESIGNS

BACKGROUND

Chip designers perform many types of operations on layouts of electronic designs with rulers in order to, for example, edit shapes or measure shape dimensions, spacing, etc. All such operations offered by EDA (electronic design automation) vendors are restricted to a single die, i.e., measuring distances between two points on one die. More recent electronic designs include three-dimensional integrated circuit designs (3DIC) or pseudo-three-dimensional (2.5D) integrated circuit designs where dies are arranged in an out-of-plane direction. These integrated circuit (IC) dies and shapes therein need to be properly aligned and arranged with respect to each other in order for the end product to function correctly or as intended. Even a single die design may include multiple metal layers, whereas some conventional EDA tools either present one metal layer of these multiple metal layers as an editable layer and the remaining metal layers as an overlaid background image that cannot be edited or selected for any layout operations.

Some other conventional EDA tools provide a co-design environment and present each metal layer of these multiple metal layers in separate design windows. For example, a first, editable metal layer may be presented in a first window, a second, editable metal layer is presented in a second window, etc. In each of these separate windows, only one metal layer is editable, and the remaining layers on the same die or on different dies are either not presented at all or presented as a background image. These background images of electronic designs may be located at the correct locations, and they may often be presented as a dimmed or partially-translucent images. Nonetheless, design components (e.g., shapes) in these background images are not active or selective and thus provide viewing purposes only without enabling a designer to select any part of the components in these background images, which may cause the designer to introduce layout mistakes when going back and forth between metal layers and create more manual correction by the designer.

Therefore, there exists a need for a method, system, and computer program product for implementing three-dimensional operations for electronic designs.

SUMMARY

Disclosed are method(s), system(s), and article(s) of manufacture for implementing three-dimensional operations for electronic designs in various embodiments. Some embodiments are directed at a method for implementing three-dimensional operations for electronic designs.

In these embodiments, the method may invoke at least these four mechanisms: (1) a cross-layer electronic design implementation mechanism coupled with at least one microprocessor of a computing system and identifying a cross-layer layout portion at least by identifying a first electronic design from a layout of an electronic design via a computing network or a bus architecture as an editable layout portion in a user interface window and identifying a second electronic design from the layout as a selectable and non-editable layout portion in the user interface window via the computing network or the bus architecture; (2) one or more ruler identification or generation mechanisms coupled with the at least one micro-processor and cross-layer electronic design implementation mechanism and determining one or more rulers at least by identifying or generating the one or more rulers for a three-dimensional operation across the first electronic design and the second electronic design on different layers; (3) a target identification mechanism coupled with an aperture identification mechanism and identifying one or more starting targets and one or more end targets within an aperture at least by determining the one or more starting targets and one or more end targets based in part or in whole upon a location of the aperture and the one or more rulers; and (4) a three-dimensional operation mechanism coupled with the target identification mechanism and the aperture identification mechanism and performing the three-dimensional operation at least by manipulating a plurality of shapes in the cross-layer layout portion based in part or in whole upon the one or more rulers.

In some of these embodiments, a rule identification and enforcement mechanism coupled with the at least one microprocessor may determine one or more rules for the one or more rulers, wherein the one or more rules comprise one or more prescribed values, one or more relationships, or a combination of at least one rule and at least one relationship, and the aperture identification mechanism coupled with the one or more ruler identification or generation mechanisms may determine one or more apertures including the aperture. In addition or in the alternative, the cross-layer electronic design implementation mechanism coupled with the aperture identification mechanism may identify one or more first shapes of interest on a first layer of the different layers in the same die design or in multiple die designs in the user interface window for the first electronic design based in part or in whole upon a first implementation stage of at least one ruler of the one or more rulers.

In some of the immediately preceding embodiments, the target identification mechanism coupled with the aperture identification mechanism may identify the one or more starting targets based in part or in whole upon the one or more first shapes of interest. In addition or in the alternative, the cross-layer electronic design implementation mechanism coupled with the aperture identification mechanism may identify one or more second shapes of interest on a second layer of the different layers in the user interface window for the second electronic design based in part or in whole upon a second implementation stage of at least one ruler of the one or more rulers, and the target identification mechanism coupled with the aperture identification mechanism may identify the one or more end targets based in part or in whole upon the one or more second shapes of interest.

In some embodiments, the target identification mechanism may identify and present one or more selectable candidate targets for identification of the one or more starting targets or identification of the one or more end targets in the user interface window. In some other embodiments, a design emphasis mechanism coupled with the target identification mechanism may emphasize at least one target of the one or more starting targets or identification of the one or more end targets in the user interface window with a textual emphasis, a graphical emphasis, or a combination of textual and graphical emphasis. In addition or in the alternative, the method may associate at least one ruler of the one or more rulers with the plurality of shapes, at least one starting target, or at least one end target and identify a change in at least a first shape of the plurality of shapes associated with the at least one ruler.

In some of these embodiments, the method may further dynamically or automatically update the at least one ruler, at least a second shape of the plurality of the shapes, the at least one starting target, and/or the at least one end target in response to the change in at least the first shape. An automatic ruler identification and generation mechanism coupled with the at least one micro-processor and the aperture identification mechanism may identify, for a first shape, one or more second shapes completely or partially covered by the aperture, and the automatic ruler identification and generation mechanism may optionally identify one or more rules, criteria, or pieces of information or data for ruler generation. In addition or in the alternative, the automatic ruler identification and generation mechanism may identify one or more first starting targets from the first shape and one or more first end targets from the one or more second shapes, and the automatic ruler identification and generation mechanism may automatically generate one or more rulers based in part or in whole upon the one or more rules, criteria, or pieces of information or data and further upon the one or more first starting targets as well as the one or more first end targets.

Some embodiments are directed at one or more hardware mechanisms that include and/or function in conjunction with at least one micro-processor as well as other related components or architectures of one or more computing systems and may be invoked to perform any of the methods, processes, or sub-processes disclosed herein. The hardware system may include one or more variants of an automatic ruler identification or generation mechanism, an interactive ruler identification or generation mechanism, an aperture identification mechanism, a rule identification and enforcement mechanism, a design emphasis mechanism, a three-dimensional (3D) operation mechanism, a target identification mechanism, and/or a design filtering mechanism in some embodiments. The hardware system may further include one or more forms of non-transitory machine-readable storage media or persistent storage devices to temporarily or persistently store various types of data or information, various rulers, various rules, various libraries, selected and selectable targets, or any other suitable information or data, etc. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one micro-processor or at least one processor core, causes the at least one micro-processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing three-dimensional operations for electronic designs are described below with reference to FIGS. 1-7.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 7 illustrates a computerized system on which a method for performing channel analyses for a communication interface of an electronic system and a method for implementing three-dimensional operations for electronic designs may be implemented.

DETAILED DESCRIPTION

Various embodiments are directed to a method, system, and computer program product for implementing three-dimensional operations for electronic designs. Other objects, features, and advantages of the invention are described in the detailed description, figures, and claims.

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of various embodiments, unless otherwise specifically described in particular embodiment(s) or recited in the claim(s). Where certain elements of embodiments may be partially or fully implemented using known components (or methods or processes), portions of such known components (or methods or processes) that are necessary for an understanding of the present invention will be described, and the detailed descriptions of other portions of such known components (or methods or processes) will be omitted for ease of explanation and to not obscure embodiments of the invention. Further, embodiments encompass present and future known equivalents to the components referred to herein by way of illustration. More details about various processes or modules to implement various embodiments are further described below with reference to FIGS. 1-7.

Figure 1:
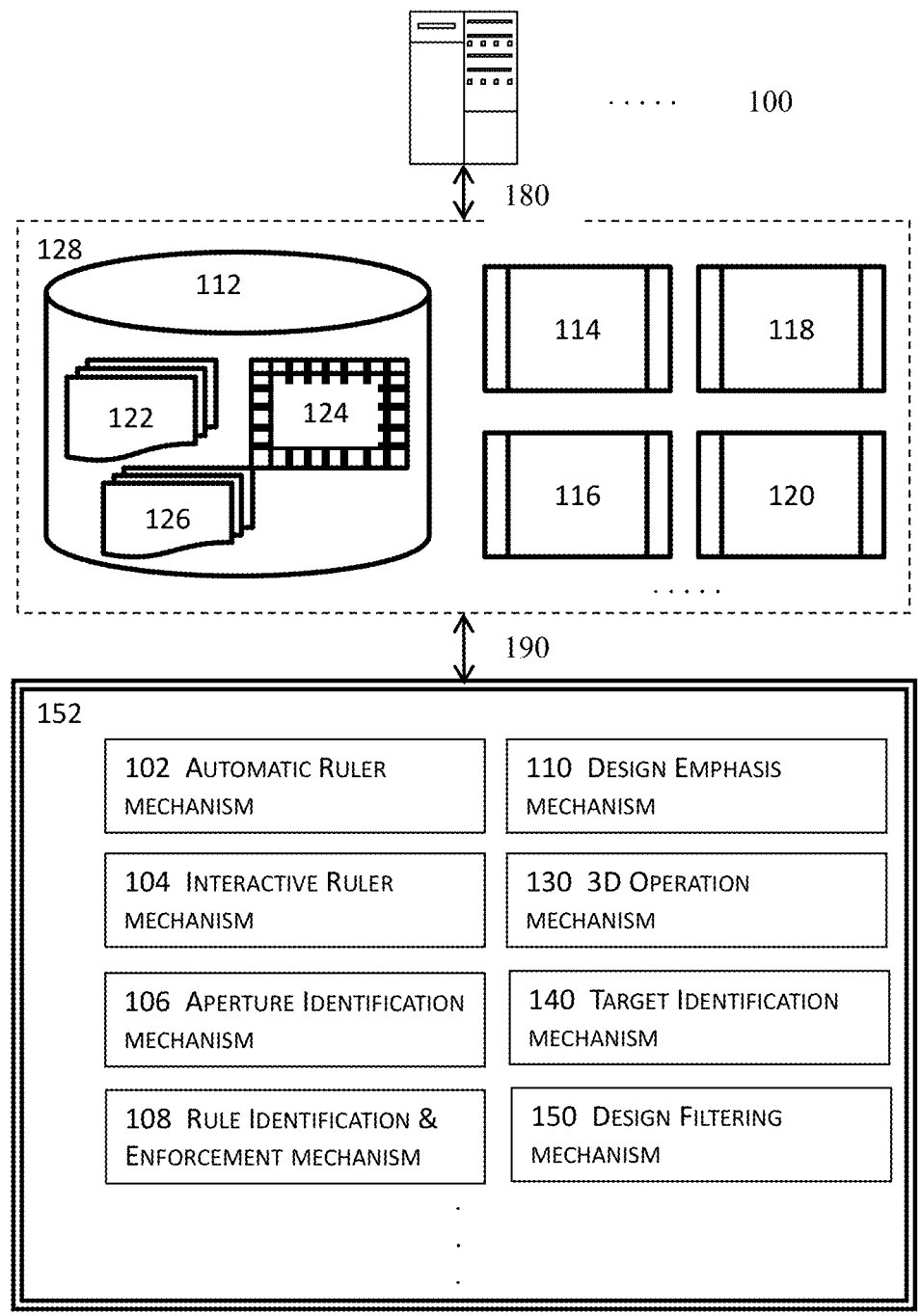
FIG. 1 illustrates a high level block diagrams for an electronic design automation system for implementing three-dimensional operations for electronic designs in one or more embodiments.

FIG. 1 illustrates a high level schematic block diagrams for an electronic design automation system for implementing three-dimensional operations for electronic designs in one or more embodiments. In one or more embodiments, the system illustrated in FIG. 1 may comprise one or more computing systems 100, such as a general purpose computer described in the System Architecture Overview section to implement one or more special proposes. Moreover, it shall be noted that the three-dimensional operations described in this application may be applied with full and equal effects to two or more layers in an electronic design that is represented as a two-dimensional (2D) view, a pseudo-three-dimensional (pseudo-3D, 3/4-perspective, or 2.5D) view, and a three-dimensional (3D) view in a single view (e.g., in a single window) of a user interface on a display apparatus. The two or more layers may include two or more metal layers, two or more routing layers, or any combinations thereof, and the electronic design may comprise one or more integrated circuit die designs in various embodiments described herein. It shall be further noted that these two or more layers may reside on the same plane having no depth difference in the out-of-plane direction or on two or more different planes having at least one depth difference in the out-of-plane direction in the electronic design.

In some embodiments, the one or more computing systems 100 may invoke various system resources such as the processor(s) or processor core(s), memory, disks, etc. The one or more computing systems 100 may also include, invoke, or function in conjunction with, via one or more computing networks and/or one or more bus architectures 180, one or more various resources 128 that may comprise a global routing mechanism, a conduit routing mechanism, a channel routing mechanism, and/or a detail routing mechanism 114, a layout editor 116, a design rule checker 118, one or more verification mechanisms 120, etc.

The one or more computing systems 100 may further write to and read from, via one or more computing networks and/or one or more bus architectures 190, a local or remote volatile or non-volatile computer accessible storage 112 that stores thereupon data or information such as, but not limited to, one or more files and/or databases (124) such as one or more physical design databases, various data, rule decks, constraints, one or more views or representations of the physical design databases, etc. (122), or other information or data (126) that may be used to facilitate the performance of various functions to achieve the intended purposes.

In some embodiments, the one or more computing systems 100 may, either directly or indirectly through various resources or mechanisms 128 to invoke various software, hardware modules, or combinations thereof 152 that may comprises an automatic ruler mechanism 102 to identify or generate one or more automatic rulers, an interactive ruler mechanism 104 to identify or interactively generate one or more rulers, an aperture identification mechanism 106 to identify one or more apertures or to manipulate one or more apertures in a design window of a user interface, a rule identification and enforcement mechanism 108 to identify and/or enforce one or more rules on at least a portion of an electronic design of interest, a design emphasis mechanism 110 to emphasize the representation of at least a portion of an electronic design with textual emphasis, graphical emphasis, or both, a 3D operation mechanism 130 to perform one or more three dimensional operations on at least a part of an electronic design layout, a target identification mechanism 140 to identify various targets (e.g., a starting target, an end target, etc.) from at least a portion of an electronic design layout, a design filtering mechanism 150 to identify one or more design components of interest from an electronic design block on one or more first layers in an electronic design layout portion and/or to filter out one or more other design components from another electronic design block on one or more second layers in the electronic design layout portion. More details about these mechanisms will be described below with reference to FIGS. 2-4.

Figure 5A:
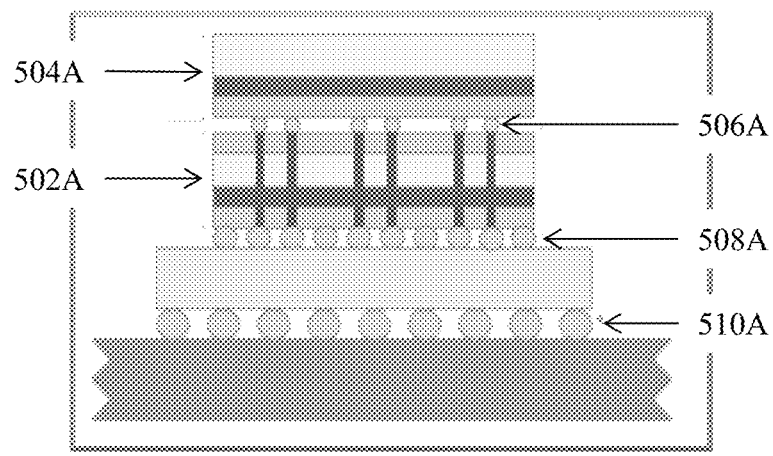
FIGS. 5A-B illustrate schematic representations of arrangements of two separate blocks of electronic designs in one or more embodiments.
Figure 5B:
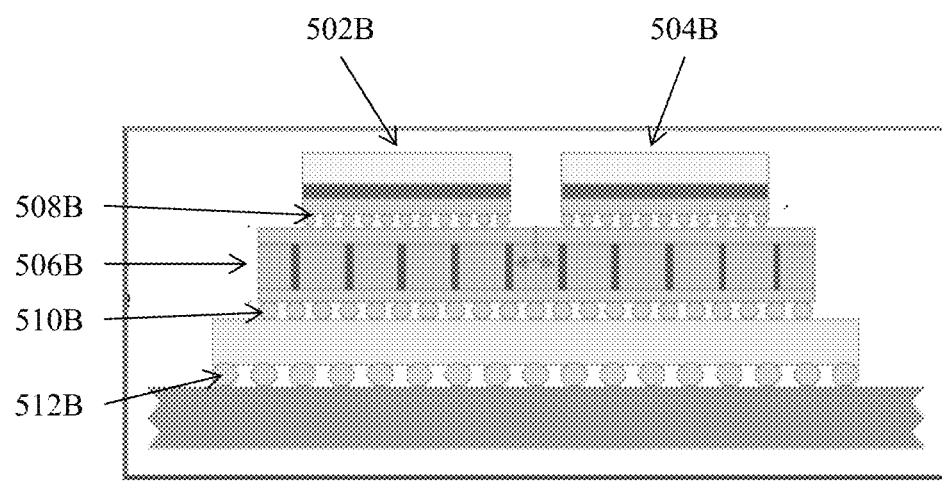

FIGS. 5A-B illustrate schematic representations of arrangements of two separate blocks of electronic designs that may be generated, modified, or operated upon by one or more mechanisms (e.g., one or more mechanisms in 152 of FIG. 1) either alone or in conjunction with the other portions of one or more computing systems 100 of FIG. 1. in one or more embodiments. The description of these schematic representations of arrangements provides some working examples of the application of certain techniques described herein and the interactions of some of the described mechanisms for these working examples. More specifically, FIGS. 5A-B illustrate two possible arrangements of two IC die designs in a single integrated circuit design. In FIG. 5A, the second IC die design 504A is stacked atop the first IC die design 502A with a first interconnect 506A (e.g., an array of micro-bumps) connecting the two IC die designs. The first IC die design may be further connected to, for example, the substrate with a second interconnect 508A (e.g., an array of flip-chip bumps), and the substrate may be connected to the PCB (printed circuit board) via a third interconnect 510A (e.g., an array of package bumps).

As it may be seen or understood from the configuration illustrated in FIG. 5A, the relative placement of the first IC die design and the second IC die design may require certain high precision to ensure that the first and second IC die designs are properly interconnected such that the single integrated circuit design performs its intended functions while meeting various requirements of performance, reliability, manufacturability, etc. With the stacked design between the first and second IC die designs, conventional approaches either require opening both IC die designs as editable in one or more windows while suffering the risk of inadvertent, undesirable modifications of one of the IC die designs or open one IC die design as editable and keep the other IC die design as a background, reference image while suffering from the shortcomings of imprecise placement of or imprecise measurements between electronic design components in these two IC die designs.

One of the advantages of certain techniques described herein is that these techniques may open the single integrated circuit design in a single window including both the first and the second IC die designs while one of the IC die designs may be opened as a fully editable design, and the other IC die design may be opened as a selectable but non-editable design. Due to the selectability and non-editability of one IC die design, electronic circuit components may be placed precisely, and precise measurements may be obtained by selecting relevant entities of these electronic circuit components in these two different IC die designs. These techniques thus completely avoid the possibility of inadvertent modifications to the selectable and non-editable IC die designs. In some embodiments, more than one IC die design may be opened as selectable and non-editable. For example, both the first and the second IC die designs in the examples illustrated in FIGS. 5A-B may be opened as selectable and non-editable for 3D operations including, for example, measurements between electronic design components in these two IC die designs.

FIG. 5B illustrates another arrangement where the first IC die design 502B is arranged alongside the second IC die design 504B. The first and the second IC die designs may include the same or different layering structures and may both be connected to, for example, an interposer 506B via a first interconnect 508B (e.g., arrays of micro-bumps).

A second interconnect 510B (e.g., an array of flip-chip bumps) may be used to interconnect the interposer 506B to a substrate which may further be connected to a PCB via the third interconnect 512B (e.g., an array of package bumps). Both schematic representations of arrangements of two separate blocks of electronic designs illustrated in FIG. 5A-B exhibit three dimensional characteristics as one move from one stack or layer to another although each stack or layer (e.g., a layer in the first IC die design) may be presented in a planar view for the designers.

A ruler may include or be associated with a command to perform one or more three-dimensional operations on a layout. A command may include a series of instructions to, for example, measure the distance between two points, two edges, two faces, a point and an edge, a point and a face, etc., to snap one edge or face of a shape to another edge or face of another shape, to align an edge or a face of a face to another edge or face of another shape, to position one shape relative to another shape, etc. in some embodiments. A command may also a series of instructions to invoke one or more other series of instructions to perform the aforementioned operations in some other embodiments.

A ruler may also include or be associated with one or more rules that need to be satisfied by the one or more shapes to which the ruler applies. For example, a first ruler may include a first rule that requires two points, two line segments, a point and a line segment, a point and a two-dimensional face, a line segment and a two-dimensional face, or two two-dimensional faces to be coincident with each other. As another example, a second ruler may include a second rule that requires two points, two line segments, a point and a line segment, a point and a two-dimensional face, a line segment and a two-dimensional face, or two two-dimensional faces to be offset from each other at a prescribed distance. In handing a single integrated circuit design including the first and second IC die designs as shown in FIG. 5B, conventional approaches suffer substantially similar disadvantages as described in the description of FIG. 5A above.

Figure 5C:
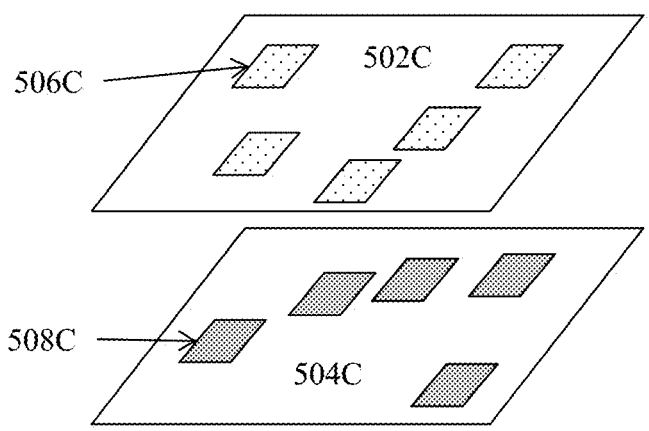
FIG. 5C illustrates a pseudo-three-dimensional layout portion of two electronic design blocks on two separate metal layers in one or more embodiments.
Figure 5D:
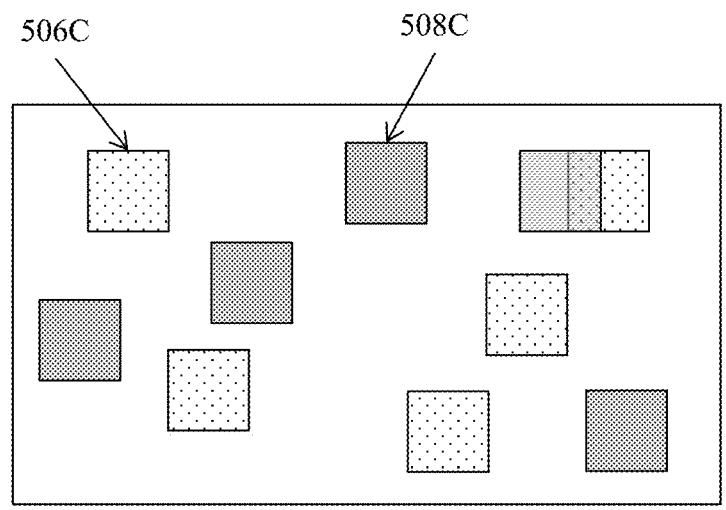
FIG. 5D illustrates a planar representation of layout portion including the two electronic design blocks illustrated in FIG. 5C in one or more embodiments.

FIGS. 5C-F illustrate the complexities in performing three-dimensional operations on a layout including multiple layers. FIG. 5C illustrates a pseudo-three-dimensional view of a layout portion of two electronic design blocks on two separate layers in one or more embodiments. More specifically, FIG. 5C illustrates that the first layout portion includes a first layer 502C comprising a plurality of first shapes 506C as well as a second layer 504C comprising a plurality of second shapes 508C. When the layout portion is presented in a planar view rather than the pseudo-3D view on a display apparatus, the layout portion appears as illustrated in FIG. 5D which illustrates a planar representation of layout portion including the two electronic design blocks illustrated in FIG. 5C in one or more embodiments.

In FIG. 5D, both the plurality of first shapes and second shapes appear in a planar view, and some shapes from both layers may overlap each other. With sufficiently few shapes or sufficiently high resolution, the risk of inadvertently or undesirably modifying a shape may be reduced. Nonetheless, as the complexities of an electronic design such as those illustrated in FIGS. 5E-F increases, the risk of inadvertently or undesirably modifying a shape also increases. More specifically, FIG. 5E illustrates an example of a layout portion including multiple electronic design blocks on multiple metal layers of an integrated circuit design in one or more embodiments.

Figures 5E, 5F:
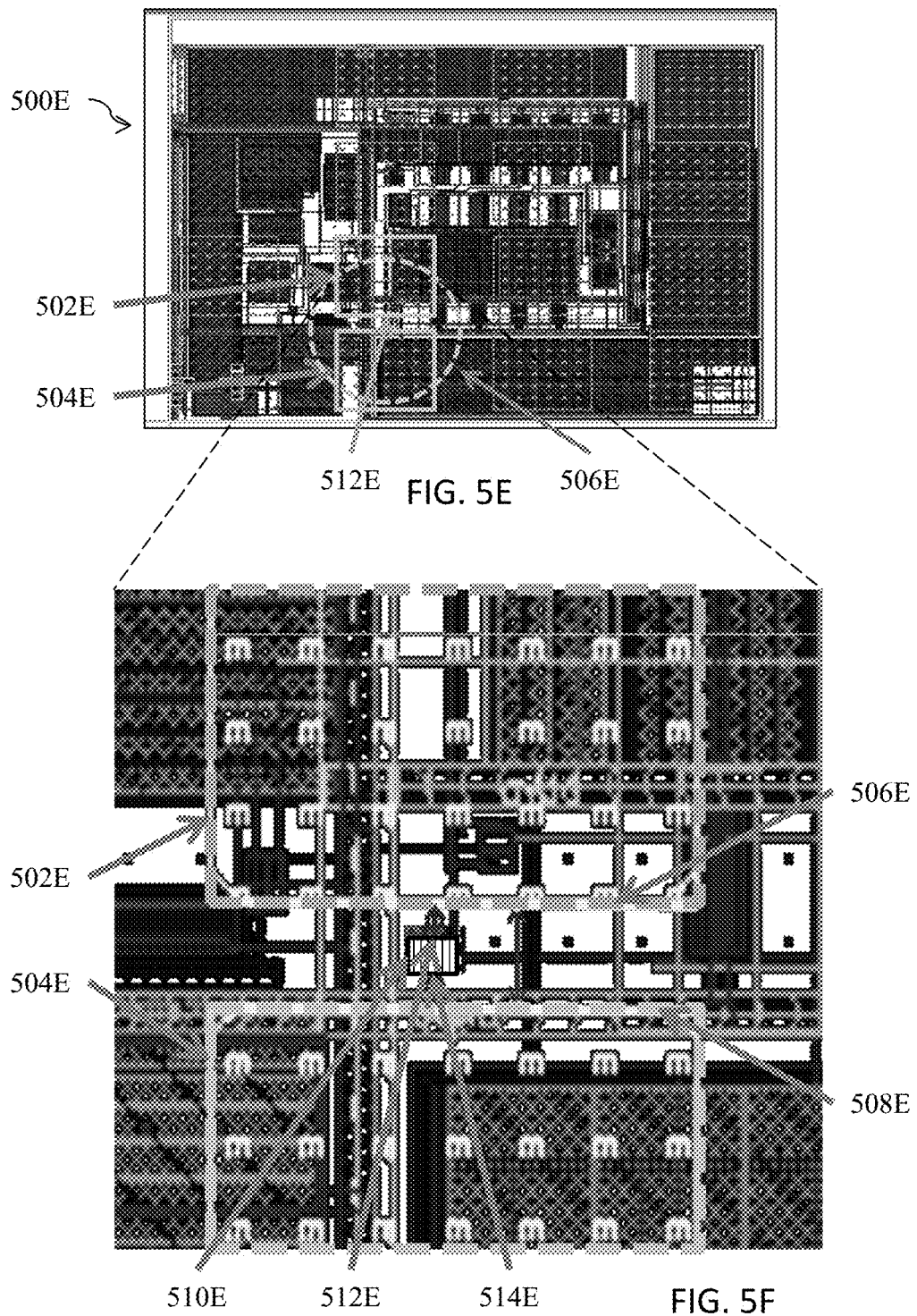
FIG. 5E illustrates an example of a layout portion including multiple electronic design blocks on multiple metal layers of an integrated circuit design in one or more embodiments.
FIG. 5F illustrates a zoom-in view of the layout portion illustrated in FIG. 5E in one or more embodiments.

The layout portion 500E illustrated in FIG. 5E includes a first circuit design block 502E and a second circuit design block 504E. Moreover, FIG. 5E illustrates a portion of a layout window where a circuit component 512E is to be inserted in the space between 502E and 504E with specific spacing requirements from the corresponding circuit components in 502E and 504E. If the corresponding circuit components in 502E and 504E belong to two separate layers in the same die design or even in different die designs, conventional approaches will include one editable layer (e.g., the layer for 502E) while the other layers remain non-editable and non-selectable for viewing purpose only or both layers as active layers. Other conventional approaches may launch multiple, separate windows each containing a fully editable layer and optionally the other layers as non-editable and non-selectable.

With some of the techniques for implementing 3D operations described herein, a layout portion presented in FIG. 5F will be presented to the user where one layer including the first circuit component in 502E may be rendered editable, and the other layer including the second circuit component in 504E will be rendered selectable and non-editable. In the aforementioned example of inserting circuit component 512E into this layout portion, these techniques may identify or generate two rulers 510E and 514E, and the placement of the circuit component 512E may be precisely and accurately controlled by at least one of these two rulers due to the fixed placement of the circuit components in 502E and 504E (and hence the fixed spacing therebetween) and the specification of the spacing in at least one ruler of 510E and 514E.

Figure 2:
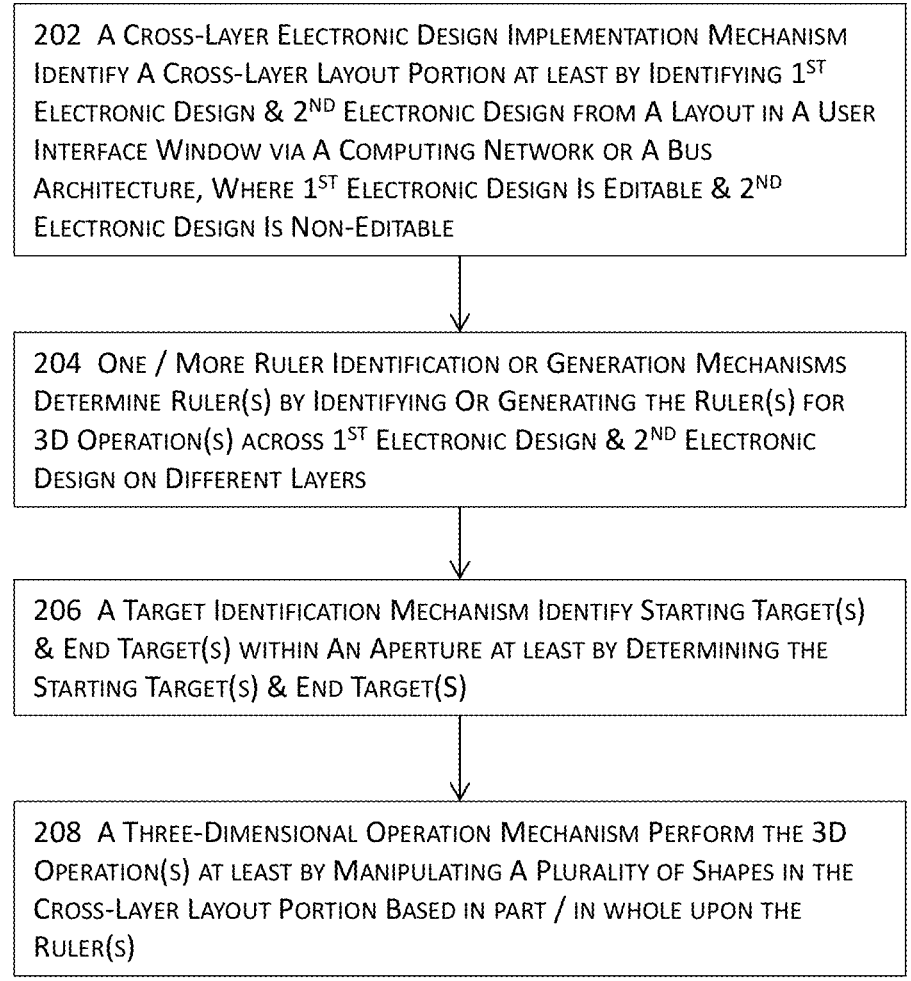
FIG. 2 illustrates a high-level block diagram for implementing three-dimensional operations for electronic designs in one or more embodiments.

FIG. 2 illustrates a high-level block diagram for implementing three-dimensional operations for electronic designs in one or more embodiments. In these embodiments, a cross-layer electronic design implementation mechanism may either automatically or interactively identify a cross-layer layout portion at 202. In some of these embodiments, the cross-layer layout portion may be determined by identifying a first electronic design on a first layer and a second electronic design on a first layer from a single layout of an electronic design and presenting the identified first and second electronic designs in a single user interface window via one or more computer buses and/or one or more computing networks at 202. It shall be noted that the first layer and the second layer of a cross-layer layout portion may reside in the same die design or in two different die designs. Furthermore, a layer may comprise a routing layer or a metal layer in a multi-layer stack-up of an electronic design. In some embodiments, a cross-layer layout portion may include electronic circuit designs in more than two layers.

The cross-layer electronic design implementation mechanism may identify the first electronic design in a way that the first electronic design is editable in some of these embodiments. A layer of an electronic design is editable when detailed design components or portions thereof may be identified or selected for modification (e.g., insertion into or deletion from the electronic design, changes in the sizes, shapes, locations, and/or other characteristics or attributes). For example, new shapes may be inserted into, and existing shapes may be removed from an editable layer of an electronic design. As another example, one or more geometric characteristics (e.g., size, shape, or location) of a shape may also be changed in an editable electronic design.

In these embodiments, cross-layer electronic design implementation mechanism may identify the second electronic design in the second layer in such a way that the second electronic design is selectable but non-editable. A layer of an electronic design is selectable when an individual design component or a portion thereof (e.g., a vertex of an edge, a midpoint of an edge, a midpoint of a face, an edge, an area of a shape, or the shape itself, etc.) may be identified for performing various operations (e.g., measurements, placement, alignment, snapping, offset, etc.)

For example, when a polygon resides in an selectable layer of an electronic design, various vertices, edges, and areas of the polygon may be identified to measure distances from a point on the polygon to another point on another design component. Nonetheless, the polygon cannot be removed from the non-editable electronic design, and various characteristics of the polygon or the remaining portion of the non-editable electronic design may not be altered due to the non-editability of the electronic design. In these embodiments, an editable layer of an electronic design is thus always selectable, but the converse is not necessarily true for a non-editable layer of an electronic design.

The first and/or second electronic design may be identified by the cross-layer electronic design implementation mechanism either automatically or interactively. For example, when a shape is inserted into or modified in a portion of a first circuit design block, the cross-layer electronic design implementation mechanism may automatically identify the first circuit design block as the first electronic design and one or more other circuit design blocks on one or more different layers as the second electronic design such that the one or more second designs are selectable yet non-editable while the first circuit block is editable. As another example, a designer may invoke a command to measure the distance between a first vertex of a first shape in a first circuit design block and a second vertex of a second shape in a second circuit design block.

The designer may, in response to the prompt of the command, use a point device to select the first vertex on the first shape and then select the second vertex on another shape in response to another prompt of the command. The cross-layer electronic design implementation mechanism may thus identify either the first circuit design block or the second design block as the first electronic design and the other as the second electronic design at 202. The cross-layer electronic design implementation mechanism may also optionally identify the remaining circuit design components on the same layer as a circuit design block as a part of the first (or second) electronic design at 202.

One of the advantages of identifying an electronic design as selectable and non-editable is that the non-editable electronic design will not be inadvertently or undesirably modified during the performance of some operations because of the non-editability of the electronic design. Another advantages of identifying an electronic design as selectable and non-editable is that the computing system involved in performing various operations no longer need to load the entire set of attributes and/or characteristics of the electronic design. Rather, the computing system only need to load, for example but not limited to, various geometric entities (e.g., vertices, edges, shapes, or 3D object) without loading other design data such as the coordinates, lengths, areas, etc. that may not be needed for an intended 3D operation. In this manner, the memory footprint of the electronic design may be reduced, and the computing system need far fewer computation cycles to process the electronic design.

In some of these embodiments illustrated in FIG. 2, the cross-layer electronic design implementation mechanism may start with identifying a reduced set of data for an non-editable electronic design and dynamically identify characteristics and/or attributes that are needed according to the intended operations. For example, the cross-layer electronic design implementation mechanism may first identify the vertices of shapes as selectable in a non-editable electronic design and, in response to a 3D operation to align a first shape to the second shape, identify some or all of the edges of the shapes as selectable in response to, for example, a command to perform a 3D alignment operation between the first and the second shapes.

At 204, one or more ruler identification or generation mechanisms may automatically or interactively determine a ruler by identifying the pre-existing ruler in some embodiments or by generating the ruler that is non-existent in some other embodiments. An electronic design in these embodiments illustrated in FIG. 2 may include a design component (e.g., a shape), a block of design components (e.g., an intellectual property cell or a macro block), or an entire IC design that resides on one or more metal or routing layers (collectively layers for plural and layer for singular).

The first electronic design identified at 202 therefore resides on one or more first layers, and the second electronic design resides on one or more second layers. The one or more first layers and the one or more second layers may belong to a single IC die design (e.g., a monolithic 3DIC) in some embodiments. For example, the first electronic design identified at 202 may belong to a first layer of an IC die design, and the second electronic design may belong to a second layer of the same IC die design. Although an electronic design for a layer may be implemented in a planar view (e.g., all circuit components are illustrated as two-dimensional shapes without showing their respective thicknesses), operations across two different layers are considered as three-dimensional because layers are stacked in an electronic design.

In various embodiments described herein, a 3D operation includes an operation that involve two shapes on two separate layers. In some other embodiments, the one or more first layers and the one or more second layers may belong to two separate IC die designs. The three-dimensionality of these 3D operations arise out of the fact that these two or more layers involved in a 3D operation includes the manipulation (e.g., selections and/or modifications, etc.) of two-dimensional or three-dimensional geometric objects both in the two-dimensional layers in which these geometric objects reside as well as across these two or more layers that reside on the same plane or on different planes. The techniques described herein may open the single IC design including these two or more layers in a single window and open at least one of these layers as a selectable and non-editable design. In some embodiments, one of these two or more layers is opened as an editable design, and the remaining layers are opened as selectable and non-editable designs. In some other embodiments, all of these two or more layers are opened in a single window as selectable and non-editable designs. In some other embodiments, the techniques described herein may also provide the option of opening more than one layer as editable.

At 206, a target identification mechanism may be invoked in conjunction with an aperture identification mechanism to identify one or more starting targets and one or more end targets within an aperture in some embodiments. An aperture may include an area of interest and may be graphically represented in the user interface window for visualization. The size, shape, and/or representation of the aperture may be customized by a designer or may have a default value. For example, an aperture may include a rectangular area having a dashed line-type boundary. In an interactive mode, the aperture may follow the cursor of a pointing device (e.g., a computer mouse).

Consequently, the area of interest represented by the aperture may change as the designer moves the cursor around in the user interface window. The target identification mechanism may determine the one or more starting targets from a first shape in, for example, the first electronic design and one or more end targets from a second shape in the second electronic design. A target may include a part of a circuit design component or even the circuit design component itself in some embodiments. For example, a target may include a vertex, a midpoint of an edge, the center of a face, an edge, a face of a shape, or even the two- or three-dimensional shape itself.

A starting target and an end target may thus comprise two geometric entities associated with a 3D operation. The aperture may also be bound with the cross-layer electronic design implementation mechanism as well as the 3D operation mechanism to facilitate the performance of various functions described herein. For example, depending upon the implementation or performance stage of a ruler and the location of the aperture, the cross-layer electronic design implementation mechanism may identify an appropriate electronic design as editable and another electronic design as selectable and non-editable.

The cross-layer electronic design implementation mechanism may also function in conjunction with the target identification mechanism (e.g., 140 of FIG. 1) to identify one or more targets for a ruler. For example, when a ruler to measure a distance between two points is at an implementation stage that requires the identification of a starting target, the cross-layer electronic design implementation mechanism may receive the location of the cursor to identify which electronic design on what layer is to be identified as editable, and which electronic design on another layer is to be identified as selectable and non-editable; the aperture identification mechanism may use at least the location of the cursor to identify the location of the aperture that follows the cursor and to present the aperture having the prescribed size and shape; and the target identification mechanism may refer to the editable electronic design covered by the aperture to identify one or more targets for an operation.

In these embodiments, target identification thus comprises a dynamic process that varies with the change of the aperture which may in turn change according to the cursor location of the point device in the user interface window. In some embodiments, the target identification mechanism may also function in conjunction with the design filtering mechanism (e.g., 150 of FIG. 1) to filter out circuit design components that do not belong to the current layer of interest based on the implementation stage of a ruler. For example, if a ruler is to align the starting target of a shape on a first layer to the end target of another shape on a second layer, and the starting target has been identified by the target identification mechanism, the target identification mechanism may function in conjunction with the design filtering mechanism to filter out the circuit design components on the first layer during the identification of the end target. By filtering out a circuit design component, the design filtering mechanism may hide the circuit design component in the user interface window in some embodiments or deactivate the circuit design component such that the circuit design component cannot be selected while the circuit design component remains visible in the user interface window.

At 208, the three-dimensional operation mechanism performs the 3D operation at least by manipulating a plurality of shapes in the cross-layer layout portion based in part or in whole upon the ruler identified or generated at 204. Depending on the ruler associated with the 3D operation, the 3D operation may include measuring a distance between the starting target and the end target, aligning a first circuit design component in a first layer with a second circuit design component in a second layer, snapping a first circuit design component in a first layer to a second circuit design component in a second layer, etc. The distance measured between a starting target and an ending target may include the distance value in the three-dimensional space in some embodiments or one or more projected distance values determined by projecting the three dimensional distance value onto one or more axes, one or more planes, or a combination thereof. More details about performing 3D operations are described below with reference to FIGS. 3A-B and 4.

Figure 3A:
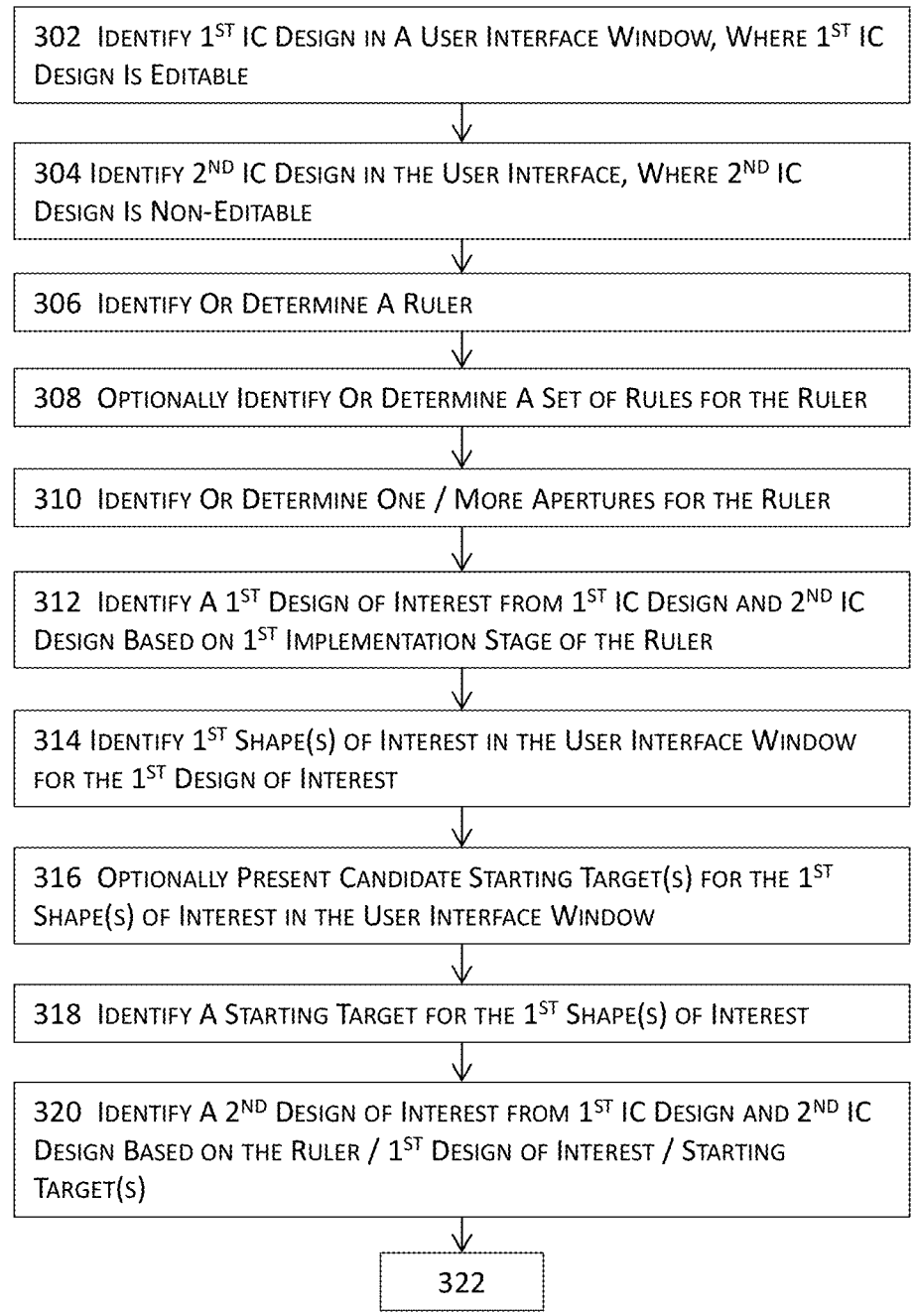
FIGS. 3A-B jointly illustrate a more detailed block diagram for implementing three-dimensional operations for electronic designs in one or more embodiments.
Figure 3B:
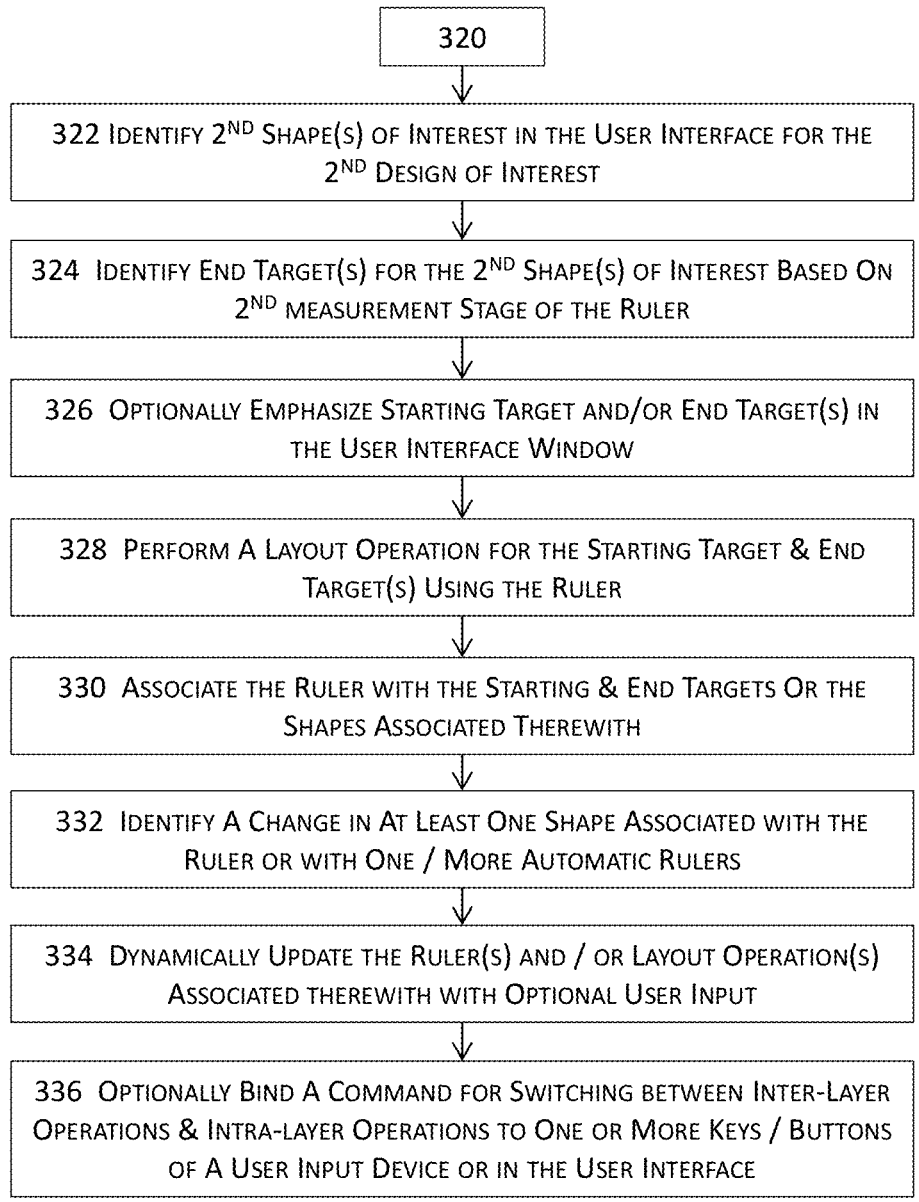

FIGS. 3A-B jointly illustrate a more detailed block diagram for implementing three-dimensional operations for electronic designs in one or more embodiments. In these illustrated embodiments, a first editable IC (integrated circuit) design may be identified in a user interface window at 302, and a second selectable, non-editable IC design may be identified at 304. In these embodiments, the first and the second IC design may belong to two separate layers on the same electronic design or on two separate electronic designs (e.g., two separate IC die design).

At 306, a ruler may be identified or determined. In some embodiments, the ruler may be interactively identified or determined with the input from the designer. For example, the ruler may be identified or determined based on the designer's selection of the starting target and the end target. As another example, a designer may enter one or more values (e.g., an offset value) for a ruler in some embodiments.

In these embodiments, the designer may thus accurately control, for example, where a shape is to be precisely inserted in a layout without any guesses, estimates, approximations, or repeated trials. For example, a designer may enter the exact number of 60 nanometers as the spacing value after identifying two opposing edges of two separate shapes on two separate layers. As another example, a designer may identify two opposing edges of two separate shapes on two separate layers and specify the center point of a third shape to be placed at a certain percentage (e.g., 40%) of the spacing value between the two opposing edges to precisely control where the third shape is to be placed.

In some other embodiments, the ruler may be identified or determined automatically by an automatic ruler mechanism (e.g., 102 of FIG. 1). For example, when a circuit design component (e.g., a shape) is inserted into a portion of an electronic design layout, the automatic ruler mechanism may automatically identify the pertinent starting targets from the circuit design component and the corresponding end targets from one or more other circuit design components in the vicinity of the inserted circuit design component.

Once the circuit design component is placed in its final location according to one or more governing design rules (e.g., a spacing rule requiring a certain spacing value from an adjacent circuit design component, an on-track design rule requiring the circuit design component be on a routing track, a multiple-exposure design rule assigning the circuit design component to a certain photomask, a minimum length rule controlling the permissible shortest length of a shape, etc.), the automatic ruler mechanism may generate one or more automatic rulers and associate the final location of the circuit design component with these one or more automatic rulers and optionally with the appropriate values and/or relationships (e.g., spacing or offset values, length value, the track assignment, connectivity relationships, positioning characteristics such as the coincident characteristic between an edge of the circuit design component and that of another circuit design component, etc.)

If one or more circuit design components associated with a ruler are subsequently modified, the ruler mechanism and/or the 3D operation mechanism may automatically update circuit design components that are affected by the modification of the one or more circuit design components. At 308, a set of rules may be optionally defined for the ruler. The set of rules may include, for example, one or more prescribed values, one or more relationships governing spatial relationships between two or more shapes in an electronic design layout portion or controlling relationships between one or more shapes and one or more design requirements (e.g., on-track requirement, coloring requirement, etc.) in some embodiments.

In some other embodiments, the set of rules may include one or more design rules governing the implementation of at least a portion of an electronic design layout. At 310, one or more apertures may be identified or determined either automatically by default or interactively with customized input from a designer. For example, a designer may enter a custom size and/or shape for the aperture to override the default size and/or shape. An aperture may follow the cursor of a pointing device (e.g., a computer mouse). Consequently, the area of interest represented by the aperture and hence the circuit design components completely or partially covered by the aperture as well as the selectable targets may change as the designer moves the cursor around in the user interface window.

At 312, a first design of interest may be identified from the first IC design and the second IC design based in part or in whole upon the implementation stage of the ruler. There may be one or more implementation stages corresponding to a ruler. For example, a first ruler may correspond to the first implementation stage at which a starting target is to be identified, a second implementation stage at which an end target is to be identified, and a third implementation stage at which a spacing value is to be identified. One or more first shapes of interest may be identified in the user interface window at 314 for the first design of interest. In some embodiments, the cross-layer electronic design implementation mechanism may identify some or all of the circuit design components on a first layer as editable or selectable yet non-editable at 314.

The cross-layer electronic design implementation mechanism may filter out some or all of the circuit design components on a second layer by rendering these some or all of the circuit design components as non-selectable and non-editable or even as invisible in the user interface window at 314 in some other embodiments. One or more candidate starting targets for the one or more first shapes of interest may be optionally presented in the user interface window at 316. For example, the target identification mechanism may identify one or more vertices, mid-points, edges, faces, or combinations thereof for the one or more first shapes of interest at 316.

At least one starting target may be identified for the one or more first shapes of interest on one or more first layers may be identified at 318. For example, the target identification mechanism may receive a user selection of a centerline of a shape as the starting target for a ruler measuring a spacing between the shape and an adjacent shape. As another example, the target identification mechanism may receive a horizontal edge and a vertical edge of a first shape for a ruler that snaps the vertical edge of the first shape to another vertical edge (a first end target) of a second shape and offsets the horizontal edge from the corresponding horizontal edge (a second end target) of the second shape.

A second design of interest may be identified at 320 from the first IC design and the second IC design for the identification of one or more end targets. In some embodiments where only two layers are presented in the user interface window, the second design of interest may be automatically identified at 320 when the first design of interest is identified at 312. In some other embodiments where more than two layers are presented in the user design window, the second design of interest may not be automatically identified without further input from a designer. Nonetheless, the first design of interest or other circuit design components on the same layer as the first design of interest may be excluded or filtered out at 320 or at 312 to simplify the identification of the second design of interest in some of these embodiments.

One or more second shapes of interest may then be identified in the user interface window at 322 for the second design of interest. In some embodiments, a shape of interest may be identified based in part or in whole upon the location and/or size of the aperture at a point in time due to the coupling between the aperture and the pointing device cursor. For example, the cross-layer electronic design implementation mechanism may identify the shapes that reside on the layer of interest and are covered completely or at least partially by the aperture as the shapes of interest in these embodiments. In some other embodiments, the cross-layer electronic design implementation mechanism may identify all of the shapes in the layer of interest as the second shapes of interest.

One or more end targets may then be identified at 324 for the one or more second shapes of interest either automatically by the target identification mechanism or interactively with the input from a designer. The target identification mechanism may also optionally identify one or more candidate end targets to aid the identification of the one or more end targets. A design emphasis mechanism (e.g., 110 of FIG. 1) may alone or function in conjunction with the target identification mechanism (e.g., 140 of FIG. 1) may optionally emphasize one or more of the identified starting targets and end targets with textual, graphical, or both textual and graphical emphasis in the user interface window at 326.

A cross-layer layout operation may be performed at 328 for the identified one or more starting targets and the identified one or more end targets using the ruler identified or determined at 306. The identified ruler may further be associated with the one or more starting targets, the one or more end targets, and/or the plurality of shapes associated therewith at 330. The cross-layer electronic design implementation mechanism may monitor and identify a change in at least one shape associated with the ruler identified at 306 or one or more automatic rulers at 332 and dynamically or automatically update the ruler, the one or more automatic rulers, and/or one or more layout operations (e.g., the layout operation performed at 328) associated therewith at 334.

In some embodiments, the automatic or dynamic update may be performed with an optional user input. For example, the mechanism may await a user input of a specific value or a user's confirmation of the automatic or dynamic update. By associating a ruler with a target or a shape, the ruler may be automatically updated in response to a change in the target or the shape. For example, a ruler measuring the distance between two opposing edges of two shapes may be associated with these two opposing edges or the two shapes such that the ruler may be automatically updated (e.g., the distance value provided by the ruler) in response to a change to one of the two opposing edges or one or these two shapes.

As another example, when two edges of two shapes are aligned with each other according to a ruler, a change in the position of one of the two edges (e.g., the shape moves or changes its geometry) will automatically result in a corresponding change in the position of the other edge of these two shapes due to the association of the ruler with these two edges or these two shapes. The cross-layer electronic design implementation mechanism may optionally bind a command for switching between inter-layer operations to one or more keys or buttons in the user input device or in the user interface at 336 such that a design may switch between inter-layer operations (e.g., measurements for shapes on the same layer) and intra-layer operations (e.g., measurements for shapes on different layers of the same IC die design or different IC die designs).

Figure 4:
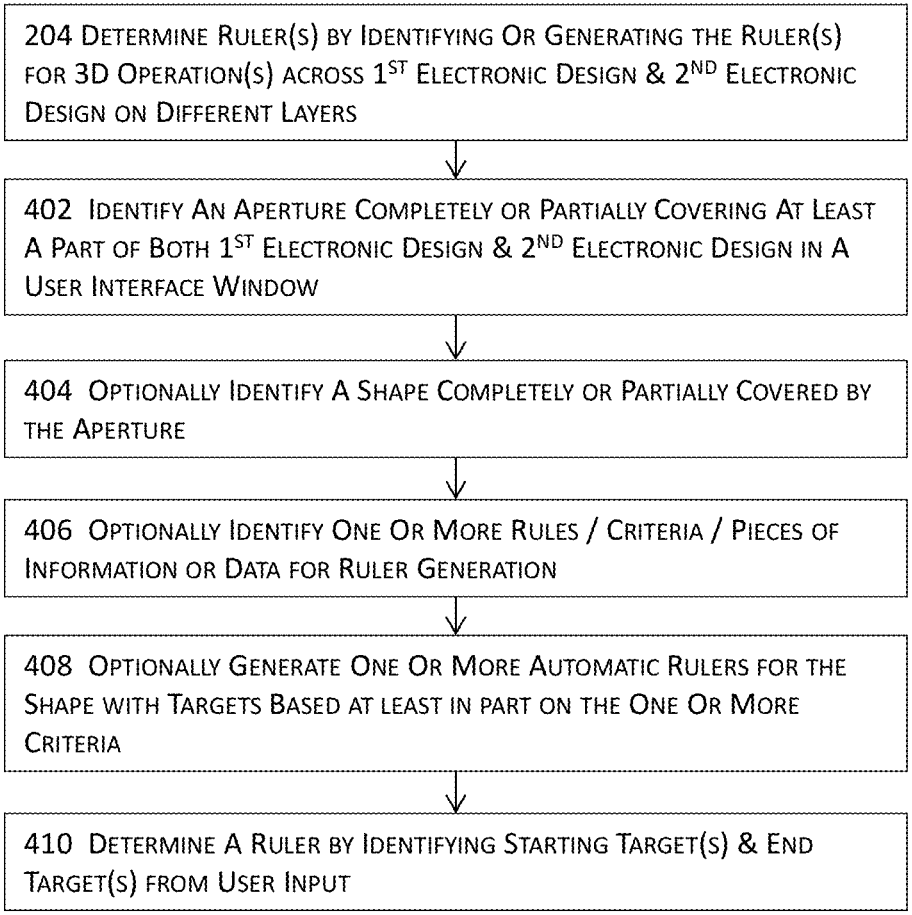
FIG. 4 illustrates a more detailed block diagram for a block illustrated in FIG. 2 for implementing three-dimensional operations for electronic designs in one or more embodiments.

FIG. 4 illustrates a more detailed block diagram for a block illustrated in FIG. 2 for implementing three-dimensional operations for electronic designs in one or more embodiments. More specifically, FIG. 4 illustrates more details about determining one or more rulers of reference numeral 204 of FIG. 2. In these embodiments illustrated in FIG. 4, an aperture covering at least a part of both the first electronic design and the second electronic design may be identified at 402. Reference numerals 404 through 408 are concerned with the optional automatic generation of one or more automatic rulers for a shape.

At 404, a shape that is completely or partially covered by the identified aperture may be optionally identified. One or more criteria or rules and/or one or more pieces of data or information for ruler generation may be optionally identified at 406. The one or more criteria or rules may include, for example, the type of the ruler (e.g., measurement, placement, etc.), one or more relationships associated with the type of the ruler (e.g., an offset relationship, aligned and coincident relationship, aligned relationship along an extended line, a combination of two or more relationships, etc.), the number and/or types of targets required by or involved in the ruler, etc. in some embodiments.

The one or more pieces of information or data may include, for example, the specific values specified by a designer, design rules governing the performance of an operation according to the ruler (e.g., a spacing design rule governing an offset ruler that offsets one shape from another shape at a prescribed offset value, etc.), or any other suitable data or information. The automatic ruler mechanism (e.g., 102 of FIG. 1) may automatically generate one or more automatic rulers for the shape by identifying one or more starting targets from the shape (e.g., one or more vertices or points, one or more edges, one or more faces, or any combinations thereof) and one or more end targets from one or more other neighboring shapes based in part or in whole upon the one or more criteria or rules and/or the one or more pieces of information or data.

As an interactively generated or identified ruler, an automatic ruler generated via 404 through 408 may be automatically associated with one or more targets or one or more shapes so that the automatic ruler may also be automatically or dynamically updated when at least one of the one or more targets or one or more shapes is changed in the design. At 410, a ruler identification or generation mechanism (e.g., reference numeral 104 of FIG. 1) may interactively determine a ruler at least by identifying one or more starting targets and one or more end targets from user input.

Figure 6A:
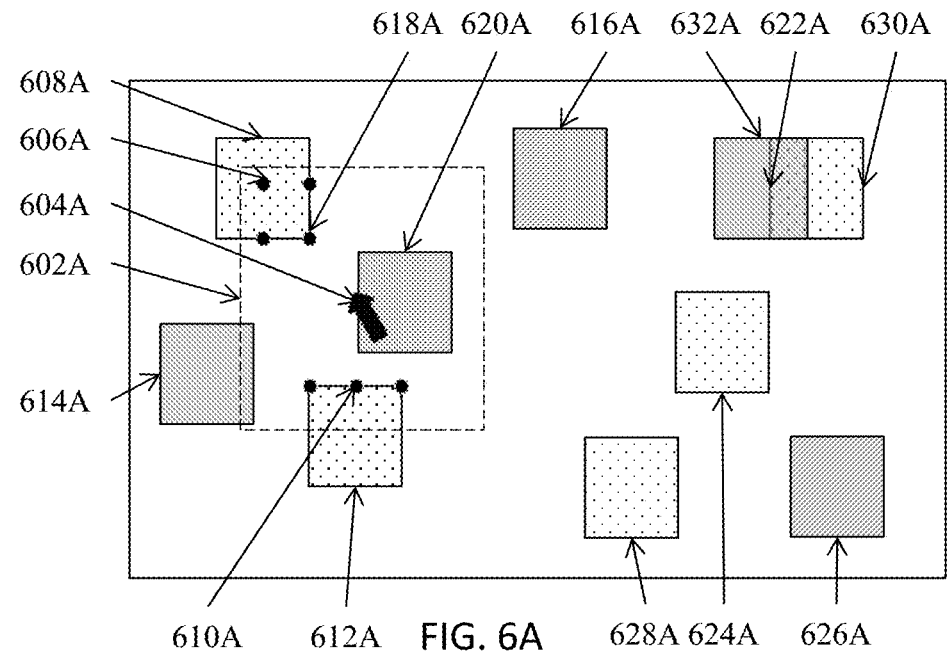
FIGS. 6A-B jointly illustrate the performance of a three-dimensional operation according to a ruler with some techniques described herein on a simplified layout portion including two electronic design blocks on two separate metal layers of one or more IC die designs in one or more embodiments.
Figure 6B:
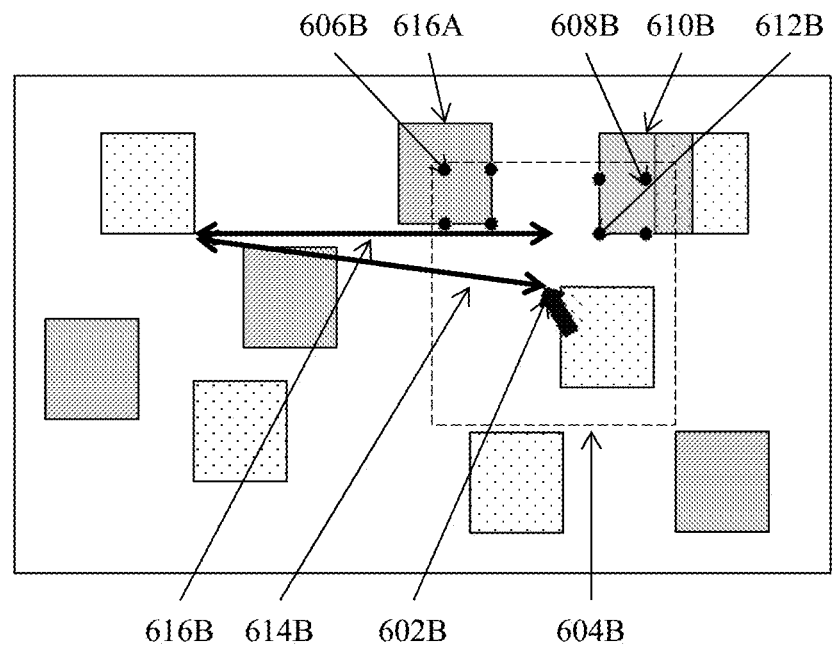

FIGS. 6A-B jointly illustrate the performance of a three-dimensional operation according to a ruler with some techniques described herein on a simplified layout portion including two electronic design blocks on two separate metal layers of one or more IC die designs in one or more embodiments. More specifically, these two figures illustrate the performance of a 3D measurement between two vertices on two different layers. FIG. 6A illustrates a simplified layout portion and an aperture 602A following the movement of a pointing device cursor 604A. The simplified layout portion includes a first set of shapes comprising shapes 608A, 612A, and the other shapes having identical dotted patterns on a first layer.

The simplified layout portion also includes a second set of shapes comprising shapes 614A, 616A, and the other shapes having identical horizontal, hatched patterns on a second layer. As FIG. 6A illustrates, the target identification mechanism may identify selectable candidate starting targets 608A (four instances) for shape 608A and selectable candidate starting targets 610A of shape 612, both of which are partially covered by the aperture 602A. No selectable targets are presented for shapes on the second layer (e.g., shapes 614A and 616A) because the shapes on the first layer are identified as the shapes of interest for the identification of starting targets of the ruler.

The selectable candidate starting target 618A is identified (e.g., by the user) as the starting target for a first ruler for performing a 3D measurement operation on the simplified layout portion. Moreover, even when a cross-layer layout portion as illustrated in FIG. 6A is provided where shape 630A in the second layer is partially overlapping with shape 632A, edge 622A of shape 630A may still be identified or selected either by a user or by certain mechanisms described in, for example, FIG. 1. For example, the first layer may be made editable, and the second layer may be made selectable and non-editable, or vice versa. A designer or a mechanism may therefore identify edge 622A without the risk of inadvertently modifying the design data of a selectable and non-editable layer.

It shall be noted that although various embodiments illustrated and described herein include two layers of electronic circuit designs, various techniques are nevertheless not limited to only two layers of electronic designs. Rather, various techniques described herein may apply with full and equal effects to an electronic design including more than two layers. In the example illustrated in FIG. 6A, assuming shape 624A belongs to a third layer, a 3D operation may be performed to, for example, place shape 624A at prescribed or custom defined distances relative to shape 626A of the first layer and shape 628A of the second layer. It shall be further noted that these two or more layers may reside in the same die design or in two or more die designs, and that one or more layers of these layers of interest may be rendered editable, and the remaining layers may be rendered selectable and non-editable.

FIG. 6B illustrates the same simplified layout portion where the pointing device cursor 602B has moved to a different location relative to the simplified layout portion. As a result, the aperture 604B also moves to a different location relative to the simplified layout portion. The 3D measurement operation is awaiting user's identification of an end target. As FIG. 6B illustrates, the target identification mechanism may identify a different set of selectable candidate end targets corresponding to this aperture location.

For example, the midpoints of two edges, a vertex, and the center point of shapes 616A and those for the shape 610B may be identified as the selectable candidate end targets corresponding to the current location of the aperture 604B. The candidate end target 612B may be identified as the end target for the ruler. As a result, the ruler may determine the three-dimensional distance (not shown), the two-dimensional distance projected onto the plane of the simplified layout (614B), or the two-dimensional distance projected onto the plane of the simplified layout and the horizontal axis (616B) and present one or more of these measured distances in the user interface window as illustrated in FIG. 6B.

Figure 6C:
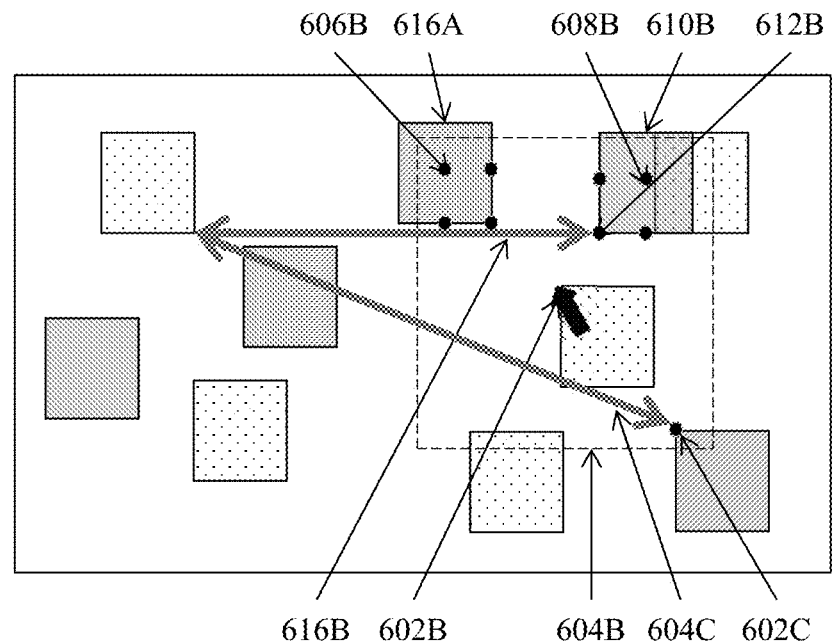
FIG. 6C illustrates the performance of another three-dimensional operation according to another ruler with some techniques described herein on a simplified layout portion illustrated in FIG. 6A or 6B in one or more embodiments.

FIG. 6C illustrates the performance of another three-dimensional operation according to another ruler with some techniques described herein on a simplified layout portion illustrated in FIG. 6A or 6B in one or more embodiments. FIG. 6C illustrates the application of multiple rulers to the same simplified layout portion with a slightly enlarged aperture 604B following the movement of the pointing device cursor 602B. Due to the larger size of the aperture 604B, one additional selectable candidate end target 602C may be identified.

The target identification mechanism may identify the same starting target as shown in FIG. 6A and identify both vertex 612B and vertex 602C as the end targets. By identifying two end targets (612B and 602C) with a single starting target (618A of FIG. 6A), the ruler may be used to measure the distances between the starting target to these two end targets. It shall be noted that in the interactive mode, one or more starting targets as well as one or more end targets of the same shape or different shapes may be identified for the determination of a single ruler. As FIG. 6C illustrates, the additional results 604C is also presented together with 616B due to the identification of one additional end target (602C) for the ruler.

Figure 6D:
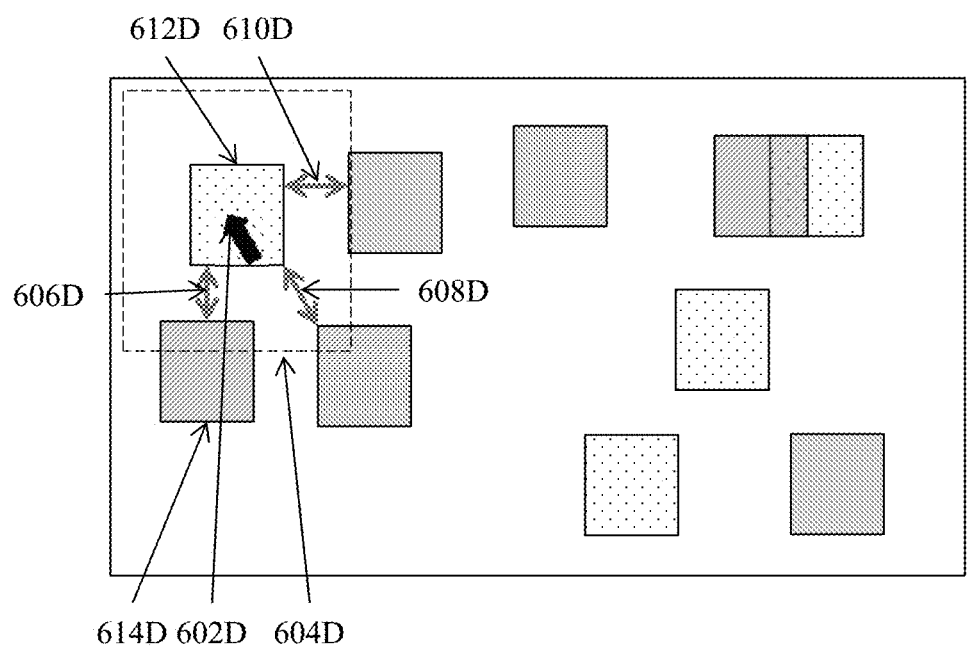
FIG. 6D illustrates the performance of another three-dimensional operation according to another ruler with some techniques described herein on a simplified layout portion including two electronic design blocks on two separate metal layers of one or more IC die designs in one or more embodiments.

FIG. 6D illustrates the performance of another three-dimensional operation according to another ruler with some techniques described herein on a simplified layout portion including two electronic design blocks on two separate metal layers of one or more IC die designs in one or more embodiments. More particularly, FIG. 6D illustrates the scenario where shape 612D is inserted into the first layer of the simplified layout portion according to the location of the pointing device cursor 602D. The aperture 604D follows the movement of the pointing device cursor 602D as illustrated in FIG. 6D.

The automatic ruler identification and generation mechanism may automatically generate three automatic rulers 606D, 608D, and 610D between the newly inserted shape 612D and its three neighboring shapes on the first layer. If the newly inserted shape 612D is subsequently modified (e.g., change in its location, shape, or size), the affected rulers and shapes will be automatically updated. For example, if ruler 610D represents a measurement ruler, the value of the measurement will be automatically or dynamically updated in response to the modification to shape 612D. As another example, of the ruler 606D represents an offset ruler at a prescribed offset distance, shape 614D will be automatically or dynamically updated in response to the modification to shape 612D to maintain the same offset distance, assuming that no other rules or requirements prevent shape 614D from being updated.

Figure 6E:
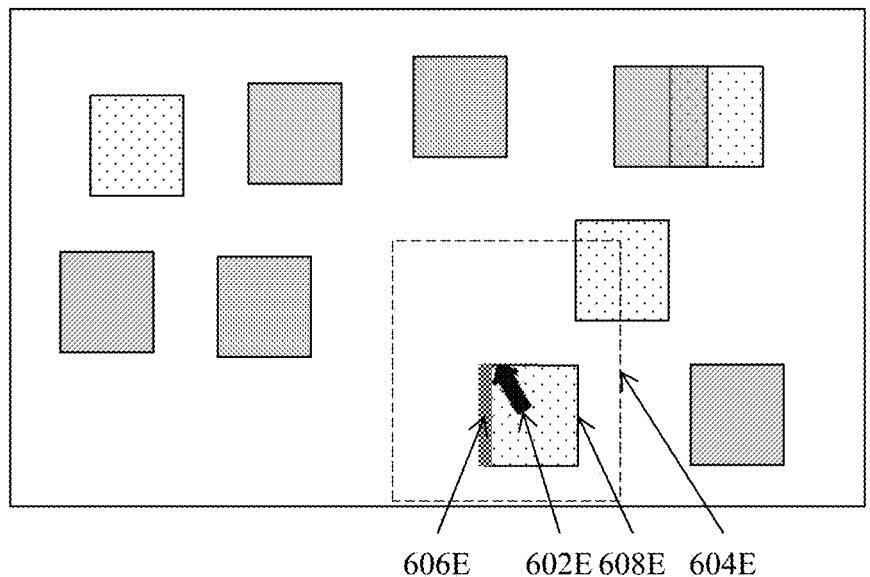
FIGS. 6E-F jointly illustrate the performance of a three-dimensional operation according to a ruler with some techniques described herein on a simplified layout portion including two electronic design blocks on two separate metal layers of one or more IC die designs in one or more embodiments.
Figure 6F:
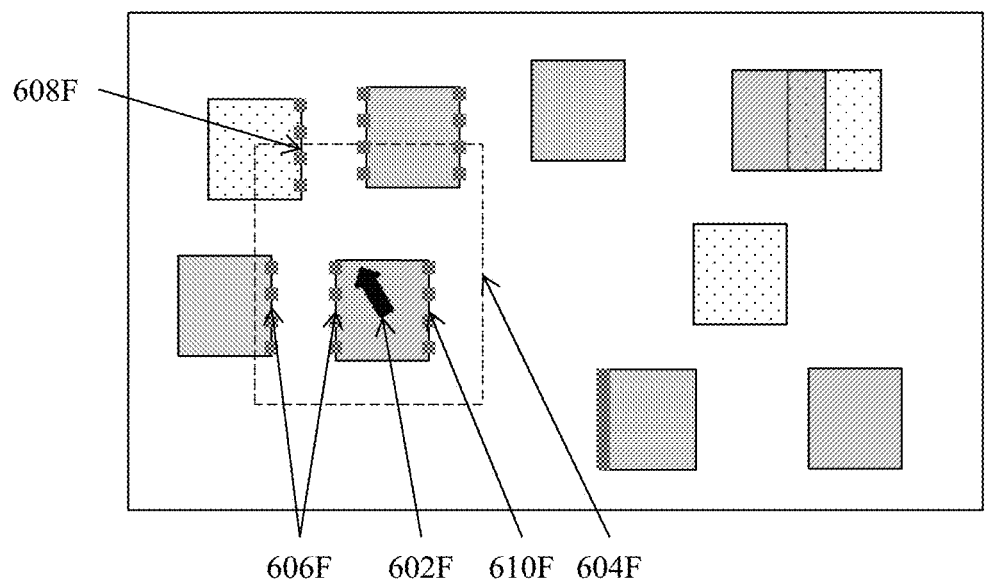

FIGS. 6E-F jointly illustrate the performance of a three-dimensional operation according to a ruler with some techniques described herein on a simplified layout portion including two electronic design blocks on two separate metal layers of one or more IC die designs in one or more embodiments. More specifically, these two figures illustrate the application of an alignment ruler for a three-dimensional alignment operation across multiple layers. FIG. 6E illustrates a simplified layout portion including shape 608E, a pointing device cursor 602E, and the corresponding aperture 604E. The user may select edge 606E as the starting target for the alignment ruler as shown in FIG. 6E.

The user may then move the pointing device cursor to the location 602F, and the aperture 604F thus follows the cursor as shown in FIG. 6F. The target identification mechanism may identify selectable candidate end targets (e.g., 606F and 610F) according to the identified starting target. Assuming a shape cannot be rotated in the simplified layout portion, only vertical edges of the shapes covered completely or partially by the aperture 604F on the second layer will be identified as selectable candidate end targets. The user may certainly switch back to inter-layer operation mode to align shape 608E to another shape on the first layer. In this inter-layer operation mode, the target identification mechanism may thus identify edge 608F as the selectable candidate end target. In this example illustrated in FIG. 6F, edge 610F is identified as the end target for the cross-layer alignment operation with the alignment ruler.

Figure 6G:
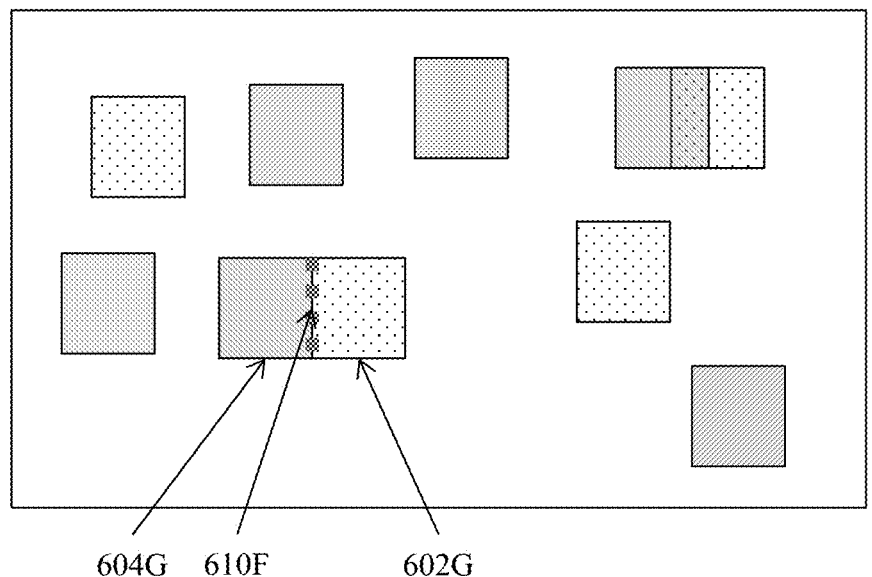
FIG. 6G illustrates the results of the performance of the three-dimensional operation according to the ruler on the simplified layout portion illustrated in FIG. 6E or 6F in one or more embodiments.

FIG. 6G illustrates the results of the performance of the three-dimensional operation according to the ruler on the simplified layout portion illustrated in FIG. 6E or 6F in one or more embodiments. More specifically, FIG. 6G illustrates that the left edge (the starting target) of shape 608E is moved to the new location 602G and is coincident with the right edge of shape 604G according to the identification of the end target 610F.

Figure 6H:
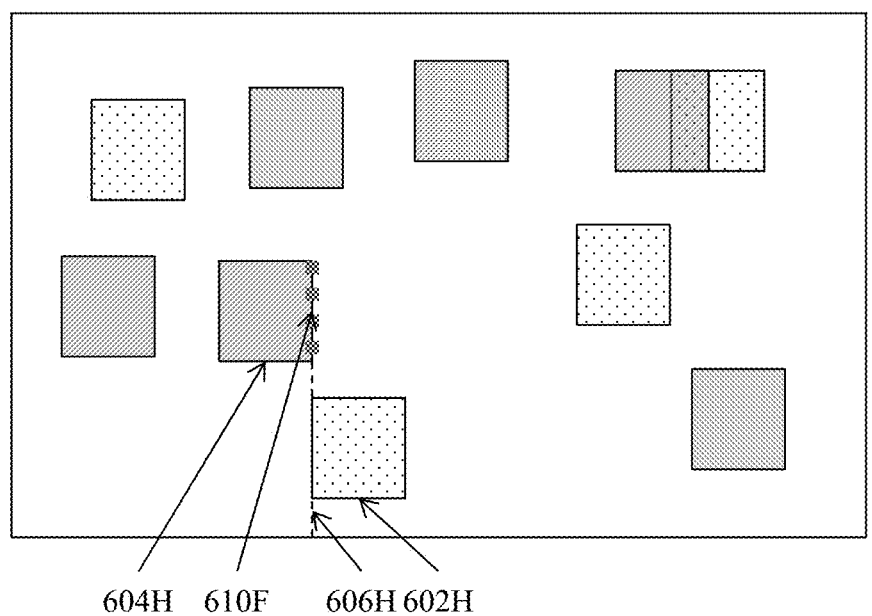
FIG. 6H illustrates the results of the performance of another three-dimensional operation according to another ruler on the simplified layout portion illustrated in FIG. 6E or 6F in one or more embodiments.

FIG. 6H illustrates the results of the performance of another three-dimensional operation according to another ruler on the simplified layout portion illustrated in FIG. 6E or 6F in one or more embodiments. More specifically, FIG. 6H illustrates that the left edge (the starting target) of shape 608E is moved to the new location 602H and is aligned with the right edge of shape 604H along an extended line 606H according to the identification of the end target 610F.

Figure 6I:
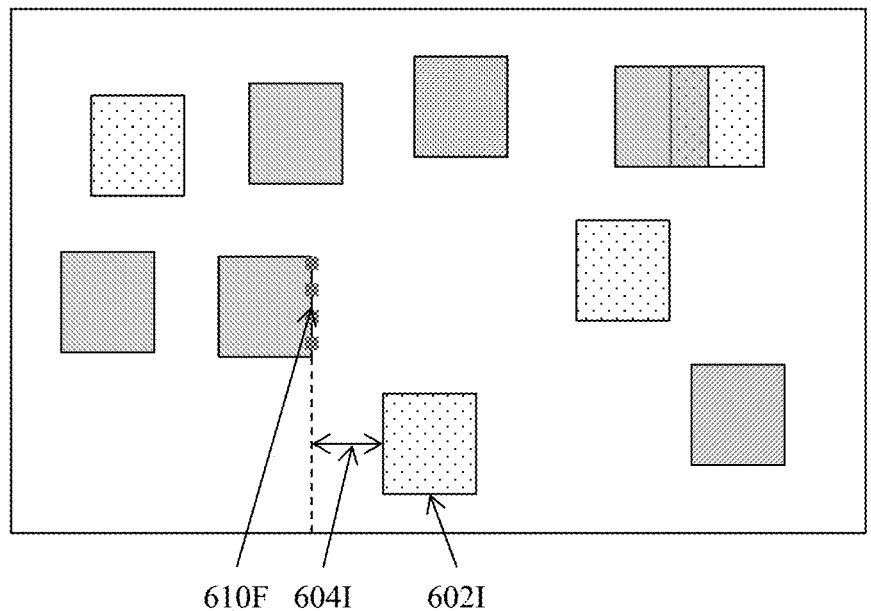
FIG. 6I illustrates the results of the performance of another three-dimensional operation according to another ruler on the simplified layout portion illustrated in FIG. 6E or 6F in one or more embodiments.

FIG. 6I illustrates the results of the performance of another three-dimensional operation according to another ruler on the simplified layout portion illustrated in FIG. 6E or 6F in one or more embodiments. More specifically, FIG. 6I illustrates that the left edge (the starting target) of shape 608E is horizontally offset to the new location 602I from an extended line according to the identification of the end target 610F and a prescribed or interactively identified offset distance 604I. It shall be noted that a three-dimensional offset operation is not limited to horizontal offset as illustrated in FIG. 6I. Rather, a three-dimensional offset may be performed with one-, two-, or three-dimensional offset values.

Figure 6J:
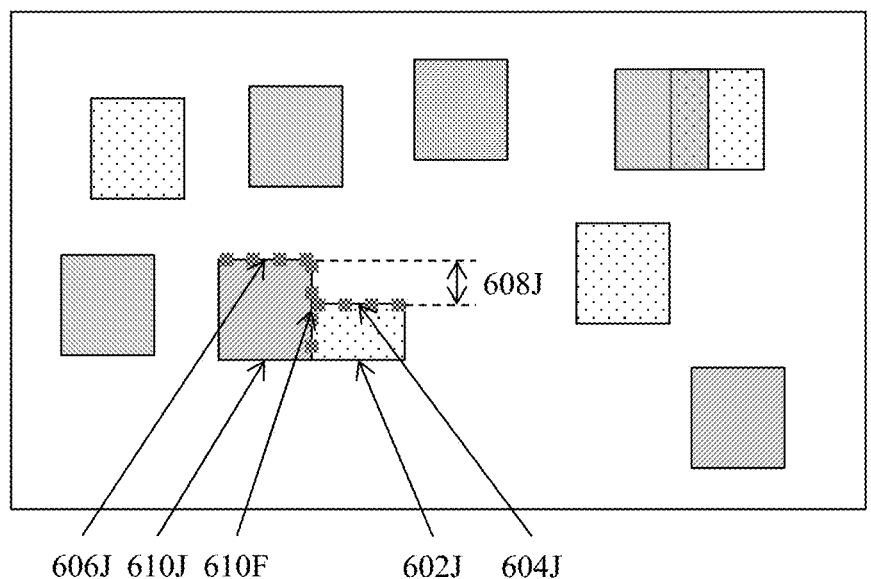
FIG. 6J illustrates the results of the performance of another three-dimensional operation according to another ruler on a layout portion similar to that illustrated in FIG. 6E or 6F in one or more embodiments.

FIG. 6J illustrates the results of the performance of another three-dimensional operation according to another ruler on a layout portion similar to that illustrated in FIG. 6E or 6F in one or more embodiments. More specifically, FIG. 6I illustrates a slightly modified layout portion where the height of shape 602J is reduced for the ease of explanation and illustration. Moreover, FIG. 6J illustrates that the left edge (the first starting target) of shape 602J is coincident to the right edge of shape 610J according to the identification of the first end target 610F. FIG. 6J also illustrates that the top edge of shape 602J (the second starting target) is offset from the second end target 606J at a prescribed or interactively identified offset distance 608J. Therefore, FIG. 6J illustrates the identification of more than one starting target from a single shape and the identification of more than one end target from another single shape although it shall be noted that multiple starting targets or multiple end targets need not be identified from a single shape in some embodiments.

Figure 6K:
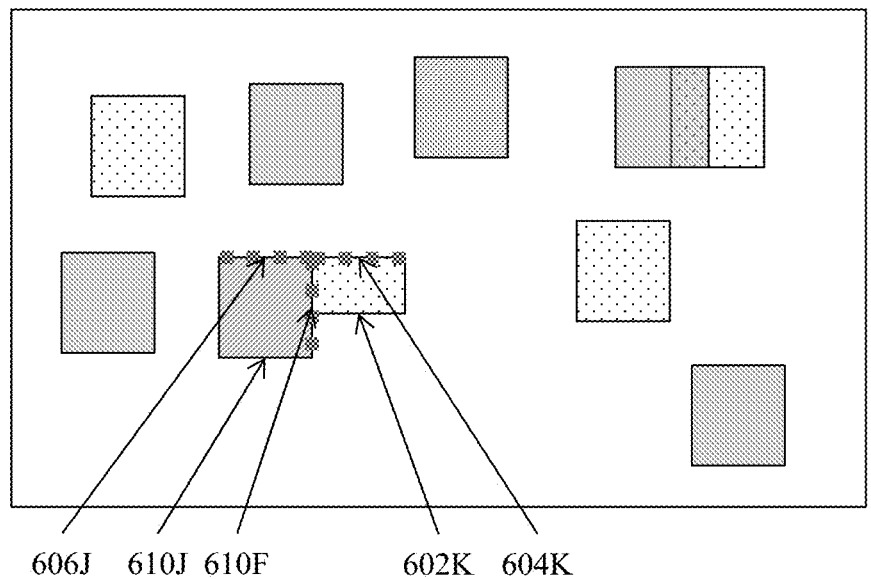
FIG. 6K illustrates the results of the performance of another three-dimensional operation according to another ruler on the layout portion illustrated in FIG. 6J in one or more embodiments.

FIG. 6K illustrates the results of the performance of another three-dimensional operation according to another ruler on the layout portion illustrated in FIG. 6J in one or more embodiments. Moreover, FIG. 6K illustrates that the left edge (the first starting target) of shape 602K is coincident to the right edge of shape 606K according to the identification of the first end target 610F. FIG. 6K also illustrates that the top edge of shape 602K (the second starting target) is coincident to the second end target 606J. Therefore, FIG. 6J again illustrates the identification of more than one starting target from a single shape and the identification of more than one end target from another single shape although it shall also be noted that multiple starting targets or multiple end targets need not be identified from a single shape in some embodiments.

Figure 6L:
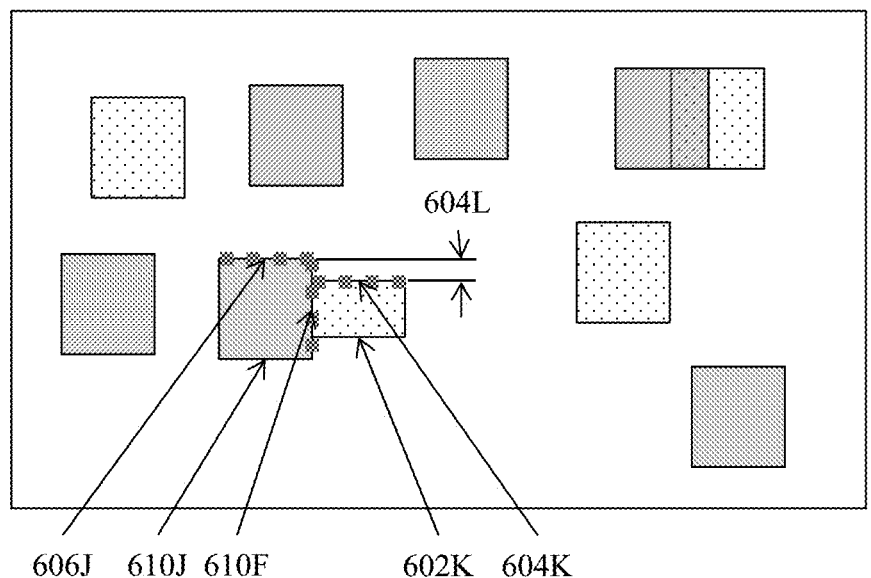
FIG. 6L illustrates the results of the performance of another three-dimensional operation according to another ruler on the layout portion illustrated in FIG. 6J in one or more embodiments.

FIG. 6L illustrates the results of the performance of another three-dimensional operation according to another ruler on the layout portion illustrated in FIG. 6J in one or more embodiments. Moreover, FIG. 6L illustrates that the left edge (the first starting target) of shape 602K is coincident to the right edge of shape 610J according to the identification of the first end target 610F. FIG. 6L also illustrates that the top edge of shape 602K (the second starting target) is offset from the second end target 606J at a prescribed or interactively identified offset distance 604L. It shall be noted that the offset may be specified between the top edges of shapes 602K and 610J as illustrated in FIG. 6L or between the bottom edges of shapes 602K and 610J in some other embodiments.

SYSTEM ARCHITECTURE OVERVIEW

FIG. 7 illustrates a block diagram of an illustrative computing system 700 suitable for implementing an IC package layout design with an integrated circuit package design estimator as described in the preceding paragraphs with reference to various figures. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control (not shown).

According to one embodiment, computer system 700 performs specific operations by one or more processor or processor cores 707 executing one or more sequences of one or more instructions contained in system memory 708. Such instructions may be read into system memory 708 from another computer readable/usable storage medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707, where the one or more processors, one or more processor cores, or combination thereof executes one or more threads. For example, the act of determining one or more estimated numbers of layers, the act of determining whether the power and/or ground layers accommodate power nets and/or thermal effects, the act of generating technology files, routing schemes, and/or via libraries, determining one or more fan-out sequences, the act of determining priorities of routing directions, the act of determining trace paths, the act of adjusting an estimated number of layers, etc. may be performed by one or more processors, one or more processor cores, or combination thereof. A mechanisms described herein may also be implemented as a pure hardware module (e.g., a block of electronic circuit components) or a combination of a hardware module and a software block that jointly perform various tasks to achieve various functions or purposes described herein or equivalents thereof. For example, a mechanism described herein may be implemented as an application-specific integrated circuit (ASIC) in some embodiments. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. In an embodiment, the computer system 700 operates in conjunction with a data storage system 731, e.g., a data storage system 731 that includes a database 732 that is readily accessible by the computer system 700. The computer system 700 communicates with the data storage system 731 through a data interface 733. A data interface 733, which is coupled with the bus 706, transmits and receives electrical, electromagnetic or optical signals that include data streams representing various types of signal information, e.g., instructions, messages and data. In embodiments of the invention, the functions of the data interface 733 may be performed by the communication interface 714.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. In another example, one of skill in the art will appreciate that the embodiments described herein can be used to address a cross-layer electronic design with more than two electronic designs with a single editable layout and multiple selectable and non-editable layouts. The specification and drawings are, accordingly, to be regarded in an illustrative rather than restrictive sense.

I claim:

1. A computer implemented method for implementing three-dimensional operations for electronic circuit designs, comprising:
   identifying, at a cross-layer electronic design implementation module at least a part of which is stored in memory and is coupled with at least one micro-processor of a computing system, a cross-layer layout portion at least by identifying a first electronic design from a layout of an electronic design via a computing network or a bus architecture as an editable layout portion in a user interface window and a second electronic design from the layout as a selectable and non-editable layout portion in the user interface window via the computing network or the bus architecture;
   loading a set of design data from the layout for the first electronic design and a reduced set of design data from the layout for the second electronic design into the memory of the computing system;
   determining one or more rulers at least by identifying or generating the one or more rulers for a three-dimensional operation across the first electronic design and the second electronic design on different layers, wherein the one or more rulers include or are associated with the three-dimensional operation or one or more rules for the three-dimensional operation;
   identifying one or more starting targets and one or more end targets within an aperture that includes an area of interest in a user interface window at least by determining the one or more starting targets and one or more end targets based in part or in whole upon a location of the aperture and the one or more rulers; and
   implementing the layout at least by performing the three-dimensional operation at least by manipulating design data from the set of design data and the reduced set of design data corresponding to a plurality of shapes in the cross-layer layout portion based in part or in whole upon the one or more rulers.

2. The computer implemented method of claim 1, further comprising:
   determining one or more rules for the one or more rulers, wherein the one or more rules comprise one or more prescribed values, one or more relationships, or a combination of at least one rule and at least one relationship.

3. The computer implemented method of claim 2, further comprising:
   determining one or more apertures including the aperture.

4. The computer implemented method of claim 1, further comprising:
   identifying one or more first shapes of interest on a first layer of the different layers in the user interface window for the first electronic design based in part or in whole upon a first implementation stage of at least one ruler of the one or more rulers.

5. The computer implemented method of claim 4, further comprising:
   identifying the one or more starting targets based in part or in whole upon the one or more first shapes of interest.

6. The computer implemented method of claim 4, further comprising:

identifying, at the cross-layer electronic design implementation module, one or more second shapes of interest on a second layer of the different layers in the user interface window for the second electronic design based in part or in whole upon a second implementation stage of at least one ruler of the one or more rulers.

7. The computer implemented method of claim 6, further comprising:
identifying the one or more end targets based in part or in whole upon the one or more second shapes of interest.

8. The computer implemented method of claim 1, further comprising:
identifying and presenting one or more selectable candidate targets for identification of the one or more starting targets or identification of the one or more end targets in the user interface window.

9. The computer implemented method of claim 1, further comprising:
emphasizing at least one target of the one or more starting targets or identification of the one or more end targets in the user interface window with a textual emphasis, a graphical emphasis, or a combination of textual and graphical emphasis.

10. The computer implemented method of claim 1, further comprising:
associating at least one ruler of the one or more rulers with the plurality of shapes, at least one starting target, or at least one end target; and
identifying a change in at least a first shape of the plurality of shapes associated with the at least one ruler.

11. The computer implemented method of claim 10, further comprising:
dynamically or automatically updating the at least one ruler, at least a second shape of the plurality of the shapes, the at least one starting target, and/or the at least one end target in response to the change in at least the first shape.

12. The computer implemented method of claim 1, further comprising:
identifying, for a first shape, one or more second shapes completely or partially covered by the aperture.

13. The computer implemented method of claim 12, further comprising:
identifying one or more rules, criteria, or pieces of information or data for ruler generation.

14. The computer implemented method of claim 13, further comprising:
identifying one or more first starting targets from the first shape and one or more first end targets from the one or more second shapes.

15. The computer implemented method of claim 14, further comprising:
generating one or more rulers based in part or in whole upon the one or more rules, criteria, or pieces of information or data and further upon the one or more first starting targets as well as the one or more first end targets.

16. A system for implementing an IC package layout design with an integrated circuit package design estimator, comprising:
one or more modules at least one of which is at least partially stored in memory and coupled to at least one processor or a processor core that executes one or more threads in a computing system;
non-transitory computer accessible storage medium holding program code that includes a sequence of instructions that, when executed by the at least one microprocessor or processor core of a computing system, cause the at least one micro-processor or processor core at least to:
identify, at a cross-layer electronic design implementation module at least a part of which is stored in the memory and is coupled with the at least one processor or the processor core, a first electronic design from a layout of an electronic design via a computing network or a bus architecture as an editable layout portion in a user interface window and receiving and identifying a second electronic design from the layout as a non-editable layout portion in the user interface window the computing network or the bus architecture,
load a set of design data from the layout for the first electronic design and a reduced set of design data from the layout for the second electronic design into the memory of the computing system;
determine one or more rulers at least by identifying or generating the one or more rulers for a three-dimensional operation across the first electronic design and the second electronic design on different layers, wherein the one or more rulers include or are associated with the three-dimensional operation or one or more rules for the three-dimensional operation,
identify one or more starting targets and one or more end targets within an aperture that includes an area of interest in a user interface window at least by determining the one or more starting targets and one or more end targets based in part or in whole upon a location of the aperture and the one or more rulers, and
implement the layout at least by performing the three-dimensional operation at least by manipulating design data from the set of design data and the reduced set of design data corresponding to a plurality of shapes in the cross-layer layout portion based in part or in whole upon the one or more rulers.

17. The system of claim 16, wherein the non-transitory memory holds the program code, and the program code includes further instructions that, when executed by the at least one micro-processor or processor core, cause the at least one processor or processor core to:
determine one or more rules for the one or more rulers, wherein the one or more rules comprise one or more prescribed values, one or more relationships, or a combination of at least one rule and at least one relationship,
determine one or more apertures including the aperture, and
identify one or more first shapes of interest on a first layer of the different layers in the user interface window for the first electronic design based in part or in whole upon a first implementation stage of at least one ruler of the one or more rulers.

18. The system of claim 16, wherein the non-transitory memory holds the program code, and the program code includes further instructions that, when executed by the at least one processor or processor core, cause the at least one micro-processor or processor core to:
identify the one or more starting targets based in part or in whole upon the one or more first shapes of interest,
identify one or more second shapes of interest on a second layer of the different layers in the user interface window for the second electronic design based in part or in whole upon a second implementation stage of at least one ruler of the one or more rulers, and identify the one or more end targets based in part or in whole upon the one or more second shapes of interest.

19. An article of manufacture comprising a non-transitory computer accessible storage medium having stored thereupon a sequence of instructions which, when executed by at least one processor or at least one processor core executing one or more threads, causes the at least one processor or the at least one processor core to perform a method for implementing three-dimensional operations for electronic circuit designs, the method comprising:

identifying, at a cross-layer electronic design implementation module at least a part of which is stored in memory and is coupled with at least one micro-processor of a computing system, a cross-layer layout portion at least by identifying a first electronic design from a layout of an electronic design via a computing network or a bus architecture as an editable layout portion in a user interface window and receiving and identifying a second electronic design from the layout as a non-editable layout portion in the user interface window the computing network or the bus architecture;

loading a set of design data from the layout for the first electronic design and a reduced set of design data from the layout for the second electronic design into the memory of the computing system;

determining one or more rulers at least by identifying or generating the one or more rulers for a three-dimensional operation across the first electronic design and the second electronic design on different layers, wherein the one or more rulers include or are associated with the three-dimensional operation or one or more rules for the three-dimensional operation;

identifying one or more starting targets and one or more end targets within an aperture that includes an area of interest in a user interface window at least by determining the one or more starting targets and one or more end targets based in part or in whole upon a location of the aperture and the one or more rulers; and implementing the layout at least by performing the three-dimensional operation at least by manipulating design data from the set of design data and the reduced set of design data corresponding to a plurality of shapes in the cross-layer layout portion based in part or in whole upon the one or more rulers.

20. The article of manufacture of claim 19, the method further comprising at least one of:

determining one or more rules for the one or more rulers, wherein the one or more rules comprise one or more prescribed values, one or more relationships, or a combination of at least one rule and at least one relationship;

determining one or more apertures including the aperture;

identifying one or more first shapes of interest on a first layer of the different layers in the user interface window for the first electronic design based in part or in whole upon a first implementation stage of at least one ruler of the one or more rulers;

identifying the one or more starting targets based in part or in whole upon the one or more first shapes of interest; and identifying one or more second shapes of interest on a second layer of the different layers in the user interface window for the second electronic design based in part or in whole upon a second implementation stage of at least one ruler of the one or more rulers.

* * * * *